US012652627B2

(12) United States Patent
Li et al.

(10) Patent No.: US 12,652,627 B2
(45) Date of Patent: Jun. 9, 2026

(54) SYSTEMS AND METHODS OF COORDINATED SERVICE PERIODS FOR WIFI

(71) Applicant: Meta Platforms Technologies, LLC, Menlo Park, CA (US)

(72) Inventors: Guoqing Li, Cupertino, CA (US); Abhishek Kumar Agrawal, Bellevue, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 467 days.

(21) Appl. No.: 17/960,518

(22) Filed: Oct. 5, 2022

(65) Prior Publication Data

US 2024/0098661 A1     Mar. 21, 2024

Related U.S. Application Data

(60) Provisional application No. 63/277,647, filed on Nov. 10, 2021.

(51) Int. Cl.
H04W 56/00 (2009.01)
H04L 5/00 (2006.01)

(52) U.S. Cl.
CPC ......... H04W 56/001 (2013.01); H04L 5/0055 (2013.01)

(58) Field of Classification Search
CPC ........... H04W 56/001; H04W 56/0015; H04W 56/002; H04W 56/0025; H04L 5/0055; H04L 1/1861
See application file for complete search history.

(56) References Cited

U.S. PATENT DOCUMENTS

| | | | |
|---|---|---|---|
| 8,908,656 B2 | 12/2014 | Sadek et al. | |
| 2017/0289933 A1* | 10/2017 | Segev | H04B 17/27 |
| 2019/0041976 A1* | 2/2019 | Veeramani | G06F 3/011 |
| 2020/0068618 A1 | 2/2020 | Ahn et al. | |
| 2021/0360646 A1* | 11/2021 | Chu | H04W 72/569 |

(Continued)

OTHER PUBLICATIONS

Chen Q., et al., "A Target Wake Time Scheduling Scheme for Uplink Multiuser Transmission in IEEE 802.11ax-Based Next Generation WLANs," IEEE Access, vol. 7, Oct. 17, 2019, pp. 158207-158222.

(Continued)

*Primary Examiner* — Brian T Le
(74) *Attorney, Agent, or Firm* — Foley & Lardner LLP

(57) ABSTRACT

A wireless communication device may include one or more processors. The one or more processors may transmit one or more first request frames to a wireless communication node and a wireless user device. The one or more first request frames may indicate to the wireless communication node to perform a first transmission to the wireless communication device during a first service period (SP). The one or more first request frames may indicate to the wireless user device to perform a second transmission to the wireless communication device during the first SP. The one or more processors may receive, during the first SP, according to the one or more first request frames, the first transmission from the wireless communication node, and the second transmission from the wireless user device.

17 Claims, 13 Drawing Sheets

(56)              References Cited

U.S. PATENT DOCUMENTS

2023/0104446 A1\*   4/2023  Ajami .................. H04W 84/12
                                                          370/329

OTHER PUBLICATIONS

"IEEE Standard for information Technology—Local and Metropolitan Area Networks—Specific Requirements—Part11: Wireless LAN Medium Access Control (MAC) and Physical Layer (PHY) Specifications-Amendment1: Enhancements for High Efficiency WLAN," Feb. 9, 2021, pp. 49-409.
International Search Report and Written Opinion for International Application No. PCT/US2022/049549, mailed, Mar. 9, 2023, 11 pages.
Office Action mailed Oct. 15, 2025 for Taiwan Application No. 111142240, filed Nov. 4, 2022, 11 pages.

\* cited by examiner

600

800

Trigger frame format

900

1000

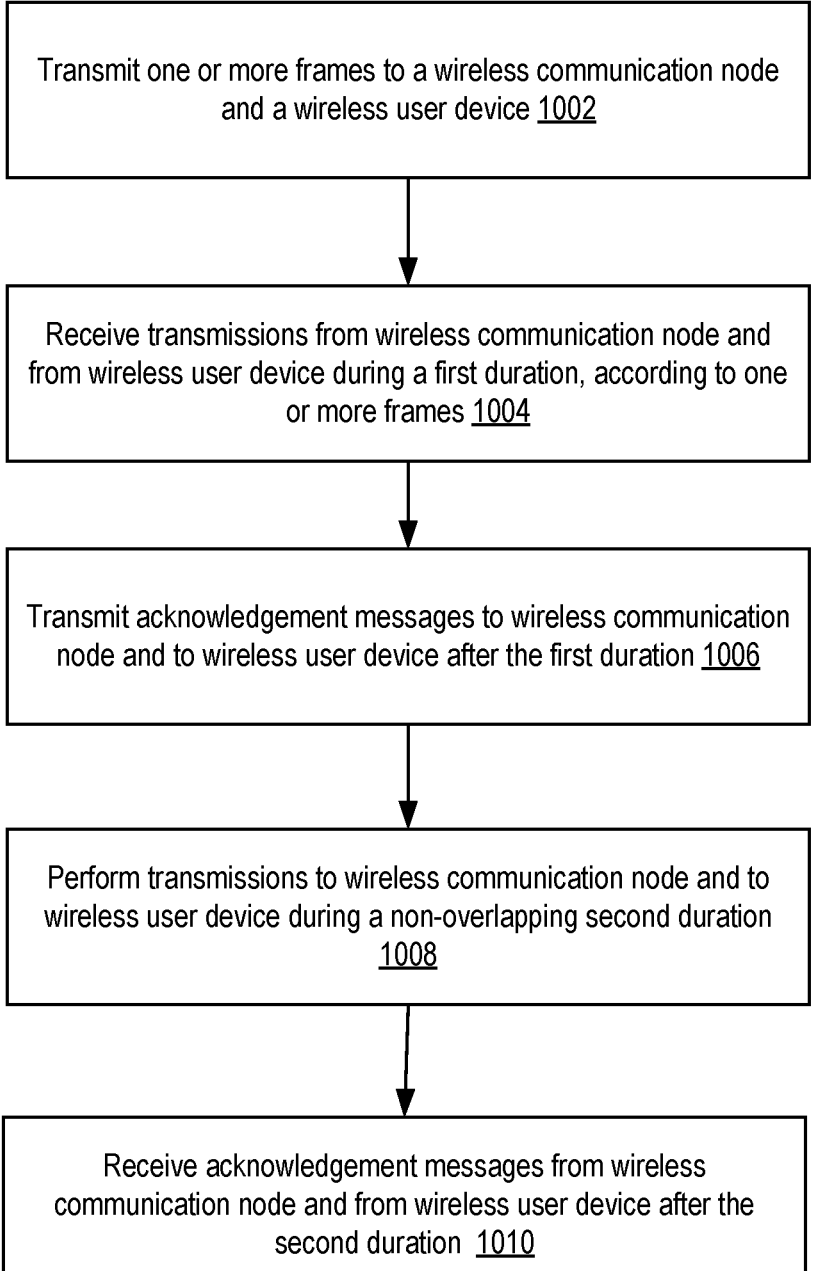

Transmit one or more frames to a wireless communication node and a wireless user device 1002

Receive transmissions from wireless communication node and from wireless user device during a first duration, according to one or more frames 1004

Transmit acknowledgement messages to wireless communication node and to wireless user device after the first duration 1006

Perform transmissions to wireless communication node and to wireless user device during a non-overlapping second duration 1008

Receive acknowledgement messages from wireless communication node and from wireless user device after the second duration 1010

Figure 11:
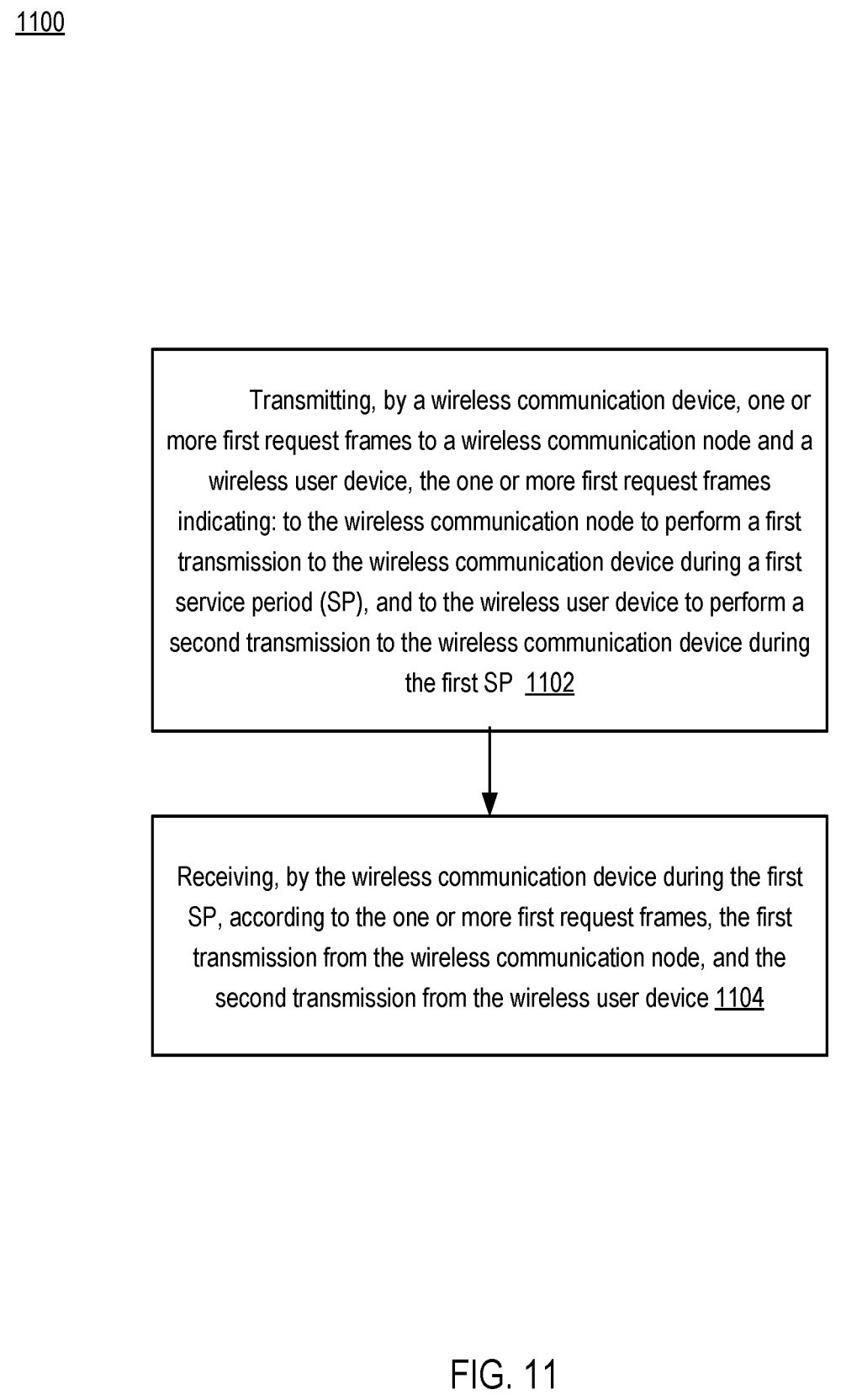

Transmitting, by a wireless communication device, one or more first request frames to a wireless communication node and a wireless user device, the one or more first request frames indicating: to the wireless communication node to perform a first transmission to the wireless communication device during a first service period (SP), and to the wireless user device to perform a second transmission to the wireless communication device during the first SP  1102

Receiving, by the wireless communication device during the first SP, according to the one or more first request frames, the first transmission from the wireless communication node, and the second transmission from the wireless user device 1104

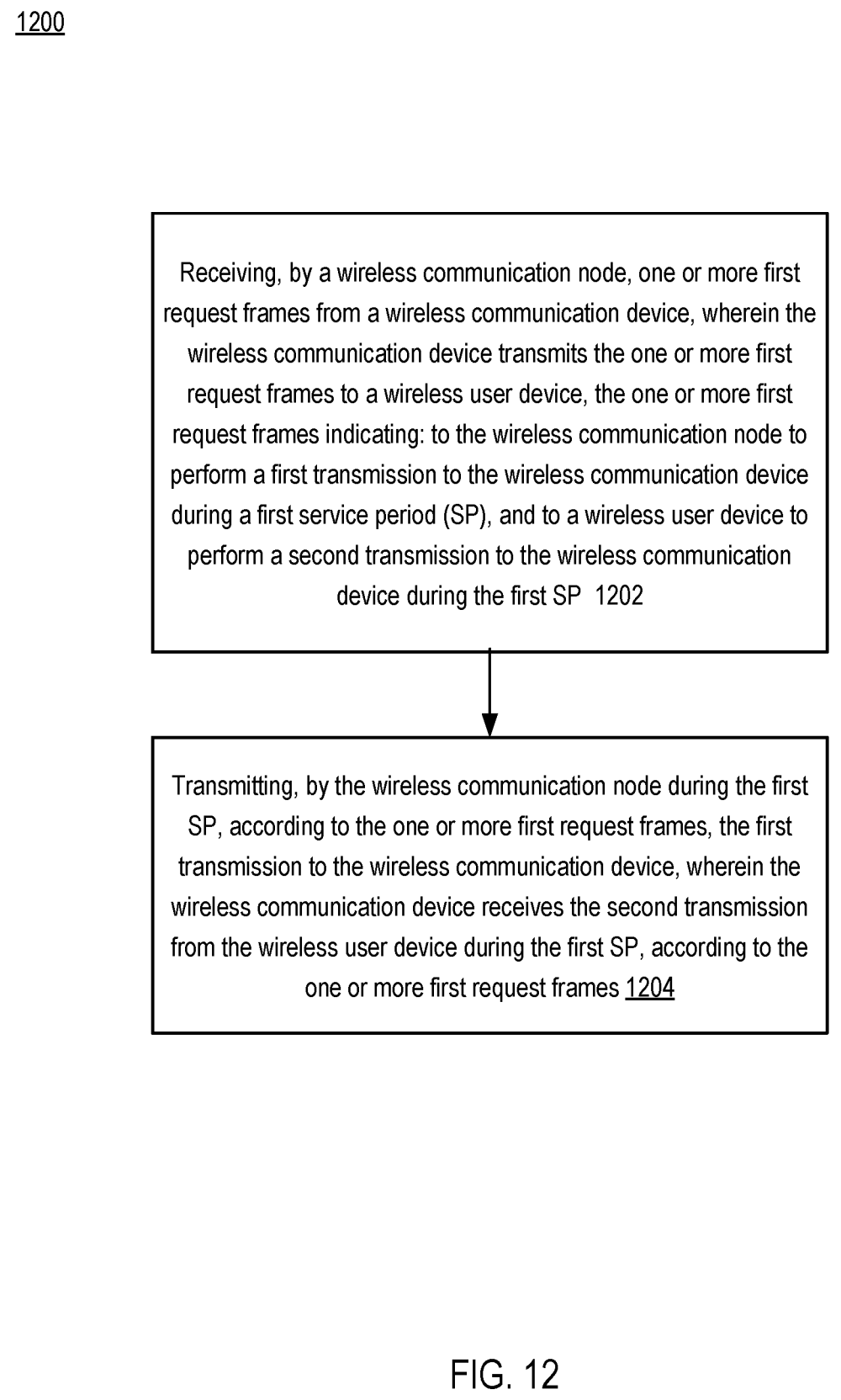

Receiving, by a wireless communication node, one or more first request frames from a wireless communication device, wherein the wireless communication device transmits the one or more first request frames to a wireless user device, the one or more first request frames indicating: to the wireless communication node to perform a first transmission to the wireless communication device during a first service period (SP), and to a wireless user device to perform a second transmission to the wireless communication device during the first SP  1202

Transmitting, by the wireless communication node during the first SP, according to the one or more first request frames, the first transmission to the wireless communication device, wherein the wireless communication device receives the second transmission from the wireless user device during the first SP, according to the one or more first request frames 1204

FIG. 12

SYSTEMS AND METHODS OF COORDINATED SERVICE PERIODS FOR WIFI

CROSS-REFERENCE TO RELATED APPLICATION

This application claims priority to U.S. Provisional Patent Application No. 63/277,647 filed on Nov. 10, 2021, which is incorporated by reference herein in its entirety for all purposes.

FIELD OF THE DISCLOSURE

The present application generally relates to systems and methods for coordinating communication periods, including but not limited to systems and methods for coordinating non-overlapping periods or durations to perform and receive transmissions, according to one or more request frames.

BACKGROUND

Artificial reality such as a virtual reality (VR), an augmented reality (AR), or a mixed reality (MR) provides immersive experience to a user. In one example, a user wearing a head wearable display (HWD) can turn the user's head, and an image of a virtual object corresponding to a location of the HWD and a gaze direction of the user can be displayed on the HWD to allow the user to feel as if the user is moving within a space of artificial reality (e.g., a VR space, an AR space, or a MR space). In certain artificial reality environments, a particular computing device may intend to communicate with a plurality of devices, such as a HWD and a network device, during a same time instance. However, due to certain hardware constraints/limitations, the computing device may be unable to simultaneously communicate with the plurality of devices.

SUMMARY

Various embodiments disclosed herein are related to systems and methods for coordinating, configuring, and/or synchronizing periods/durations for performing simultaneous transmissions and/or receptions across a plurality of channels (e.g., wireless channels, such as intralinks and/or interlinks). A wireless communication device (e.g., a console, a mobile device, a stage device, and/or a computing device), for example, may coordinate simultaneous transmissions or receptions across the plurality of channels, to reduce and/or decrease a transmit/transmission (Tx) and/or receive/reception (Rx) latency of the plurality of channels, thereby improving the performance of the wireless communication device. In some embodiments, the wireless communication device may support/enable coordinated simultaneous transmissions (e.g., Tx+Tx) and/or coordinated simultaneous receptions (e.g., Rx+Rx) across the plurality of channels, without allowing simultaneous transmissions and receptions (e.g., simultaneous Tx of the intralink and Rx of the interlink).

In certain embodiments, the systems and methods described herein may include a novel approach for coordinating and/or configuring one or more service periods (SPs) for simultaneous transmissions and/or simultaneous receptions across the plurality of channels. Certain features, such as a Target Wake Time (TWT) feature and/or a reverse direction grant (RDG) feature, can be modified and/or used to define said service period(s) or durations for simultaneous transmissions/receptions (e.g., Tx or Rx only). In some embodiments of the present disclosure, the novel approach may define an operating mode that allows the wireless communication device (e.g., a client device and/or a stage device, such as an AR computing device) to determine, define, and/or control the time and/or duration of transmissions (e.g., Tx) from a wireless communication node, for example (e.g., an access point (AP)). In such an operating mode, the wireless communication node may be unable to transmit, send, and/or communicate data to the wireless communication device (e.g., a stage device) without receiving permission (e.g., from the wireless communication device via a RDG feature and/or a trigger frame) to transmit.

Various embodiments disclosed herein are related to a wireless communication device including one or more processors. The one or more processors may be configured to transmit (e.g., via a transceiver) one or more first request frames to a wireless communication node and a wireless user device. The one or more first request frames may indicate to the wireless communication node to perform a first transmission to the wireless communication device during a first service period (SP). The one or more first request frames may indicate to the wireless user device to perform a second transmission to the wireless communication device during the first SP. The one or more processors may be configured to receive (e.g., via the transceiver), during the first SP, according to the one or more first request frames, the first transmission from the wireless communication node, and the second transmission from the wireless user device.

In some embodiments, the one or more first request frames may include a field indicating that the first SP is used for downlink only. In some embodiments, the one or more processors may be further configured to transmit, after the first SP, according to the one or more first request frames, a first acknowledgement message to the wireless communication node, and a second acknowledgement message to the wireless user device. The one or more first request frames may include a field indicating that acknowledgement messages are to be transmitted after the first SP.

In some embodiments, the one or more processors may be configured to transmit one or more second request frames to the wireless communication node and the wireless user device. The one or more second request frames may indicate to the wireless communication node to receive a third transmission from the wireless communication device during a second SP that is non-overlapping with the first SP, and to transmit a third acknowledgement message to the wireless communication device after the second SP. The one or more second request frames may indicate to the wireless user device to receive a fourth transmission from the wireless communication device during the second SP, and to transmit a fourth acknowledgement message to the wireless communication device after the second SP. The one or more processors may be configured to perform, during the second SP, according to the one or more second request frames, the third transmission to the wireless communication node, and the fourth transmission to the wireless user device.

In some embodiments, the one or more second request frames may include a field indicating that the second SP is used for uplink only. In some embodiments, the one or more processors may be further configured to receive, after the second SP, according to the one or more second request frames, the third acknowledgement message from the wireless communication node, and the fourth acknowledgement message from the wireless user device.

Various embodiments disclosed herein are related to a method including transmitting, by a wireless communication device, one or more first request frames to a wireless communication node and a wireless user device. The one or more first request frames may indicate to the wireless communication node to perform a first transmission to the wireless communication device during a first service period (SP). The one or more first request frames may indicate to the wireless user device to perform a second transmission to the wireless communication device during the first SP. The method may include receiving, by the wireless communication device during the first SP, according to the one or more first request frames, the first transmission from the wireless communication node, and the second transmission from the wireless user device.

In some embodiments, the one or more first request frames may include a field indicating that the first SP is used for downlink only. In some embodiments, the wireless communication device may transmit, after the first SP, according to the one or more first request frames, a first acknowledgement message to the wireless communication node, and a second acknowledgement message to the wireless user device. The one or more first request frames may include a field indicating that acknowledgement messages are to be transmitted after the first SP.

In some embodiments, the wireless communication device may transmit one or more second request frames to the wireless communication node and the wireless user device. The one or more second request frames may indicate to the wireless communication node to receive a third transmission from the wireless communication device during a second SP that is non-overlapping with the first SP, and to transmit a third acknowledgement message to the wireless communication device after the second SP. The one or more second request frames may indicate to the wireless user device to receive a fourth transmission from the wireless communication device during the second SP, and to transmit a fourth acknowledgement message to the wireless communication device after the second SP. The wireless communication device may perform, the during the second SP, according to the one or more second request frames, the third transmission to the wireless communication node, and the fourth transmission to the wireless user device.

In some embodiments, the one or more second request frames may include a field indicating that the second SP is used for uplink only. In some embodiments, the wireless communication device may receive, after the second SP, according to the one or more second request frames, the third acknowledgement message from the wireless communication node, and the fourth acknowledgement message from the wireless user device.

Various embodiments disclosed herein are related to a method including receiving, by a wireless communication node, one or more first request frames from a wireless communication device. The wireless communication device may transmit the one or more first request frames to a wireless user device. The one or more first request frames may indicate to the wireless communication node to perform a first transmission to the wireless communication device during a first service period (SP). The one or more first request frames may indicate to the wireless user device to perform a second transmission to the wireless communication device during the first SP. The method may include transmitting, by the wireless communication node during the first SP, according to the one or more first request frames, the first transmission to the wireless communication device. The wireless communication device may receive the second transmission from the wireless user device during the first SP, according to the one or more first request frames.

In some embodiments, the one or more first request frames may include a field indicating that the first SP is used for downlink only. In some embodiments, the wireless communication node may receive, after the first SP, according to the one or more first request frames, a first acknowledgement message from the wireless communication device. The wireless communication device may transmit a second acknowledgement message to the wireless user device after the first SP, according to the one or more first request frames.

In some embodiments, the wireless communication node may receive one or more second request frames from the wireless communication device. The wireless communication device may transmit the one or more second request frames to the wireless user device. The one or more second request frames may indicate to the wireless communication node to receive a third transmission from the wireless communication device during a second SP that is non-overlapping with the first SP, and to transmit a third acknowledgement message to the wireless communication device after the second SP. The one or more second request frames may indicate to the wireless user device to receive a fourth transmission from the wireless communication device during the second SP, and to transmit a fourth acknowledgement message to the wireless communication device after the second SP. The wireless communication node may receive, during the second SP, according to the one or more second request frames, the third transmission from the wireless communication device. The wireless communication device may perform the fourth transmission to the wireless user device during the second SP, according to the one or more second request frames.

In some embodiments, the one or more second request frames may include a field indicating that the second SP is used for uplink only. In some embodiments, the wireless communication node may transmit, after the second SP, according to the one or more second request frames, the third acknowledgement message to the wireless communication device. The wireless communication device may receive the fourth acknowledgement message from the wireless user device after the second SP, according to the one or more second request frames.

BRIEF DESCRIPTION OF THE DRAWINGS

The accompanying drawings are not intended to be drawn to scale. Like reference numbers and designations in the various drawings indicate like elements. For purposes of clarity, not every component can be labeled in every drawing.

FIG. 9 and FIG. 10 are flowcharts of example methods for coordinating and/or configuring Tx and/or Rx operations across a plurality of channels, according to example implementations of the present disclosure.

FIG. 11 and FIG. 12 are flowcharts of example methods for coordinating and/or configuring Tx and/or Rx operations across a plurality of channels, according to example implementations of the present disclosure.

DETAILED DESCRIPTION

Figure 1:
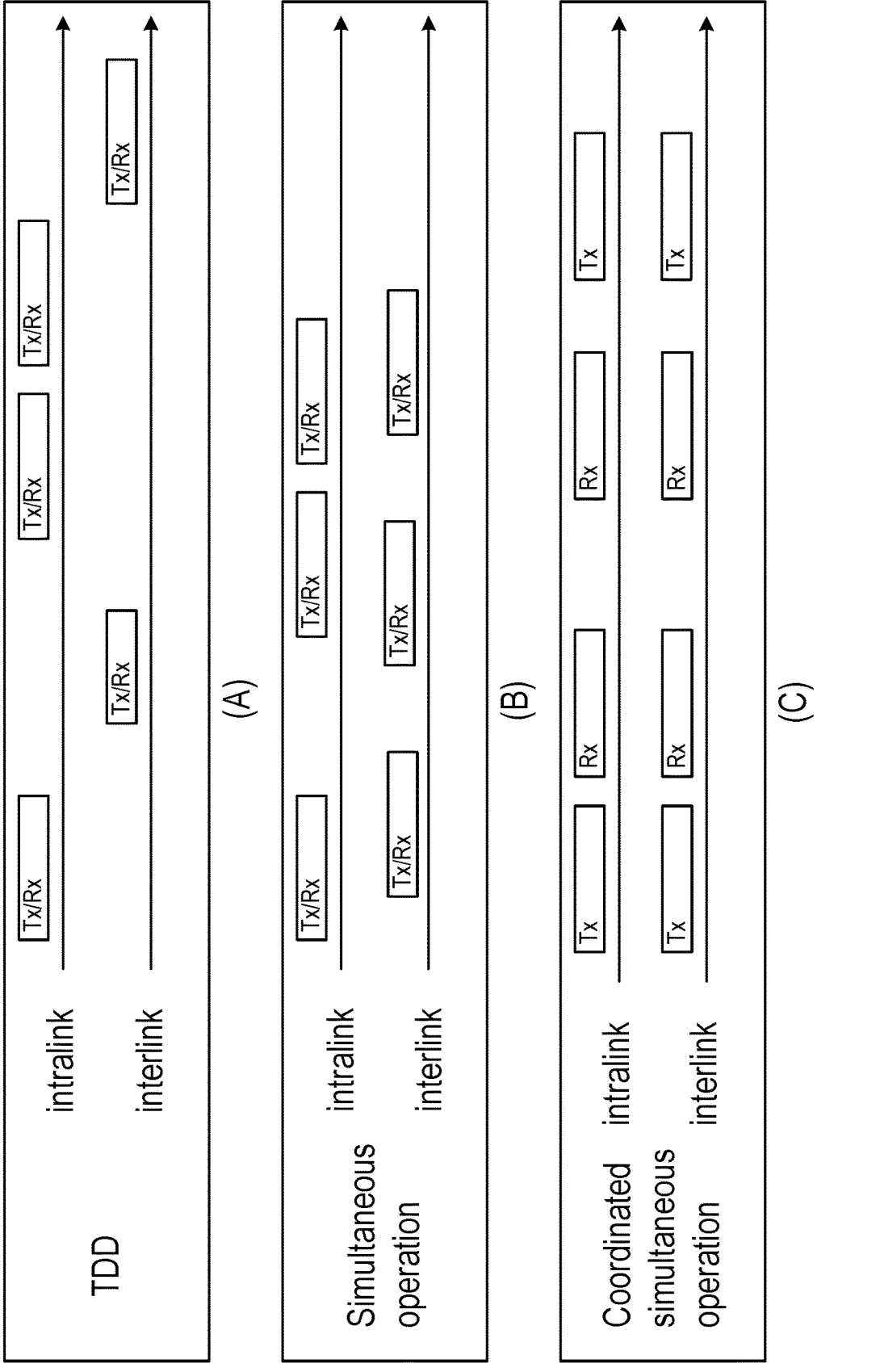
FIG. 1 is a diagram of example Tx and/or Rx operating modes across a plurality of channels, according to example implementations of the present disclosure.

Before turning to the figures, which illustrate certain embodiments in detail, it should be understood that the present disclosure is not limited to the details or methodology set forth in the description or illustrated in the figures. It should also be understood that the terminology used herein is for the purpose of description only and should not be regarded as limiting.

The systems and methods presented herein include a novel approach for coordinating, configuring, and/or synchronizing periods (e.g., time periods, such as SPs, and/or time durations) to perform and/or receive transmissions across a plurality of channels (e.g., wireless channels between devices and/or nodes, such as intralinks and/or interlinks). A wireless communication device (e.g., a console, a mobile device, a stage device, an AR device, a VR device, and/or a computing device), for instance, can coordinate simultaneous transmit (Tx) and receive (Rx) operations across the plurality of channels (e.g., a plurality of AR/VR channels or links). In certain scenarios, the wireless communication device may share a wireless channel (e.g., a connection and/or link, such as an intralink connection) with a wireless user device (e.g., a head wearable device (HWD), such as AR glasses). In some embodiments, the wireless communication device may share a channel (e.g., a connection and/or link, such as an interlink connection) with a wireless communication node (e.g., a Wi-Fi access point (AP)). In one example, an interlink connection may include or correspond to a cellular connection (e.g., long term evolution (LTE) or 5G), a WiFi connection, and/or other types of connections to an external carrier network. An intralink connection, for instance, may be a WiFi/60 GHz connection (or other types of connections) to one or more wireless user devices (e.g., one or more HWDs).

Currently, in certain scenarios, a plurality of channels (e.g., intralink and interlink connections) of the wireless communication device may be unable to operate (e.g., Tx/Rx operation) in a simultaneous manner (e.g., simultaneous Tx and/or Rx operations across the plurality of channels) by using same and/or adjacent bands (e.g., 5 GHz and/or 6 GHz bands). Constraints and/or limitations introduced by radio-frequency (RF) front-end designs, antenna isolation, and/or WiFi chipsets may prevent simultaneous usage and/or operation of the plurality of channels (e.g., simultaneous transmissions and receptions across the plurality of channels). Due to said constraints/limitations, the wireless communication device, for example, can only use a single channel from the plurality of channels (e.g., a single intralink or a single interlink) to Tx/Rx at a given time instance. In such a scenario, the plurality of channels can operate in a time-division duplex (TDD) manner (and/or other operating modes), thereby causing Tx/Rx delays (e.g., increasing latency) in the plurality of channels.

In some embodiments, operating in a TDD manner may increase the Tx/Rx latency of the plurality of channels. In a TDD operation (see FIG. 1A), only a single channel (e.g., interlink or intralink) can be used to Tx/Rx at a particular time instance. In other words, the wireless communication device (and/or other devices/nodes) may be unable to simultaneously perform and/or receive a transmission via the intralink connection and the interlink connection, resulting in an inefficient usage of the plurality of channels (e.g., causing an increase in latency). Indeed, simultaneous operation of the plurality of channels (e.g., simultaneous Tx/Rx operations across the intralink and interlink) can reduce the Tx/Rx latency of the channels. As seen in FIG. 1B, for instance, by performing Tx and/or Rx operations at same and/or overlapping time instances (e.g., via both the intralink and interlink), the wireless communication device can perform a same amount of Tx/Rx operations in less time (when compared to a TDD operation, as seen in FIG. 1A), thereby reducing a latency of the channels. However, due to the increasing complexity of the RF front-end design and cost concerns, the plurality of channels may operate in a simultaneous Tx mode (e.g., Tx+Tx mode) and/or a simultaneous Rx mode (e.g., Rx+Rx mode), rather than in a simultaneous Tx+Rx mode.

In a simultaneous Tx mode (e.g., see FIG. 1C), a wireless communication device may perform simultaneous transmissions (e.g., to a wireless user device and a wireless communication node) via the plurality of channels, while in a simultaneous Rx mode (e.g., see FIG. 1C), the wireless communication device may perform simultaneous receptions via the channels. As such, in a Tx and/or Rx mode, the wireless communication device can perform Tx and/or Rx operations in a plurality of channels at a same time instance, rather than performing a Tx/Rx operation in a single channel at a same time instance (e.g., see TDD operation, FIG. 1A). In some embodiments of the present disclosure, the plurality of channels can perform simultaneous transmissions (e.g., Tx+Tx mode) or simultaneous receptions (e.g., Rx+Rx mode), but may be unable to perform simultaneous transmissions and receptions (e.g., Tx+Rx mode) across the channels (e.g., due to the complexity of the RF front-end design and increasing costs). Coordinating simultaneous transmissions or receptions of the plurality of channels can substantially decrease the Tx/Rx latency of the plurality of channels (e.g., compared to a TDD operation). As such, the systems and methods presented herein include a novel approach for coordinating simultaneous transmissions or receptions across the plurality of channels (e.g., Tx+Tx mode or Rx+Rx mode) to reduce the Tx/Rx latency of the channels, thereby improving the performance of the wireless communication device.

In one approach, embodiments in the present disclosure relate to techniques for coordinating, configuring, and/or synchronizing periods/durations for performing simultaneous transmissions and/or receptions across a plurality of channels (e.g., wireless channels, such as intralinks and/or interlinks). A wireless communication device (e.g., a console, a mobile device, a stage device, and/or a computing device), for example, may coordinate simultaneous transmissions or receptions across the plurality of channels, to reduce and/or decrease a transmit/transmission (Tx) and/or receive/reception (Rx) latency of the plurality of channels, thereby improving the performance of the wireless communication device. In some embodiments, the wireless communication device may support/enable coordinated simultaneous transmissions (e.g., Tx+Tx) and/or coordinated simultaneous receptions (e.g., Rx+Rx) across the plurality of channels, without allowing simultaneous transmissions and receptions (e.g., simultaneous Tx of the intralink and Rx of the interlink).

In certain embodiments, the systems and methods described herein may include a novel approach for coordinating and/or configuring one or more service periods (SPs) for simultaneous transmissions and/or simultaneous receptions across the plurality of channels. Certain features, such as a Target Wake Time (TWT) feature and/or a reverse direction grant (RDG) feature, can be modified and/or used to define said service period(s) or durations for simultaneous transmissions/receptions (e.g., Tx or Rx only). In some embodiments of the present disclosure, the novel approach may define an operating mode that allows the wireless communication device (e.g., a client device and/or a stage device, such as an AR computing device) to determine, define, and/or control the time and/or duration of transmissions (e.g., Tx) from a wireless communication node, for example (e.g., an access point (AP)). In such an operating mode, the wireless communication node may be unable to transmit, send, and/or communicate data to the wireless communication device (e.g., a stage device) without receiving permission (e.g., from the wireless communication device via a RDG feature and/or a trigger frame) to transmit.

In one approach, embodiments in the present disclosure relate to techniques for coordinating, configuring, and/or synchronizing periods to perform and/or receive transmissions between a plurality of devices and/or nodes. A wireless communication device may transmit one or more request frames to a wireless communication node and a wireless user device. The one or more request frames may indicate to the wireless communication node to perform a first transmission to the wireless communication device during a first service period (SP). The one or more request frames may indicate to the wireless user device to perform a second transmission to the wireless communication device during the first SP. The one or more request frames may indicate to the wireless communication node to receive a third transmission from the wireless communication device during a second SP that is non-lapping with the first SP, and to transmit a first acknowledgement message to the wireless communication device after the second SP. The one or more request frames may indicate to the wireless user device to receive a fourth transmission from the wireless communication device during the second SP, and to transmit a second acknowledgement message to the wireless communication device after the second SP.

During the first SP, the wireless communication device may receive, according to the one or more request frames, the first transmission from the wireless communication node, and the second transmission from the wireless user device. After the first SP, the wireless communication device may transmit, according to the one or more request frames, a third acknowledgement message to the wireless communication node, and a fourth acknowledgement message to the wireless user device. During the second SP, the wireless communication device may perform, according to the one or more request frames, the third transmission to the wireless communication node, and the fourth transmission to the wireless user device. After the second SP, the wireless communication device may receive, according to the one or more request frames, the first acknowledgement message from the wireless communication node, and the second acknowledgement message from the wireless user device.

In one approach, the present disclosure is directed to a method for coordinating periods to perform and/or receive transmissions, according to one or more request frames. A wireless communication node may receive one or more request frames from a wireless communication device, wherein the wireless communication device transmits the one or more request frames to a wireless user device. The one or more request frames may indicate to the wireless communication node to perform a first transmission to the wireless communication device during a first service period (SP). The one or more request frames may indicate to the wireless user device to perform a second transmission to the wireless communication device during the first SP. The one or more request frames may indicate to the wireless communication node to receive a third transmission from the wireless communication device during a second SP that is non-lapping with the first SP, and to transmit a first acknowledgement message to the wireless communication device after the second SP. The one or more request frames may indicate to the wireless user device to receive a fourth transmission from the wireless communication device during the second SP, and to transmit a second acknowledgement message to the wireless communication device after the second SP.

During the first SP, the wireless communication node may transmit, according to the one or more request frames, the first transmission to the wireless communication device. The wireless communication device may receive the second transmission from the wireless user device during the first SP, according to the one or more request frames. After the first SP, the wireless communication node may receive, according to the one or more request frames, a third acknowledgement message from the wireless communication device. The wireless communication device may transmit a fourth acknowledgement message to the wireless user device after the first SP, according to the one or more request frames. During the second SP, the wireless communication node may receive, according to the one or more request frames, the third transmission from the wireless communication device. The wireless communication device may perform the fourth transmission to the wireless user device during the second SP, according to the one or more request frames. After the second SP, the wireless communication node may transmit, according to the one or more request frames, the first acknowledgement message to the wireless communication device. The wireless communication device may receive the second acknowledgement message from the wireless user device after the second SP, according to the one or more request frames.

In one approach, the present disclosure is directed to a method for coordinating periods to perform and/or receive transmissions, according to one or more request frames. A wireless user device may receive one or more request frames from a wireless communication device, wherein the wireless communication device transmits the one or more request frames to a wireless communication node. The one or more request frames may indicate to the wireless communication node to perform a first transmission to the wireless communication device during a first service period (SP). The one or more request frames may indicate to the wireless user device to perform a second transmission to the wireless communication device during the first SP. The one or more request frames may indicate to the wireless communication node to receive a third transmission from the wireless communication device during a second SP that is non-lapping with the first SP, and to transmit a first acknowledgement message to the wireless communication device after the second SP. The one or more request frames may indicate to the wireless user device to receive a fourth transmission from the wireless communication device during the second SP, and to transmit a second acknowledgement message to the wireless communication device after the second SP.

During the first SP, the wireless user device may transmit, according to the one or more request frames, the second transmission to the wireless communication device. The wireless communication device may receive the first transmission from the wireless communication node during the first SP, according to the one or more request frames. After the first SP, the wireless user device may receive, according to the one or more request frames, a fourth acknowledgement message from the wireless communication device. The wireless communication device may transmit a third acknowledgement message to the wireless communication node after the first SP, according to the one or more request frames. During the second SP, the wireless user device may receive, according to the one or more request frames, the fourth transmission from the wireless communication device. The wireless communication device may perform the third transmission to the wireless communication node during the second SP, according to the one or more request frames. After the second SP, the wireless user device may transmit, according to the one or more request frames, the second acknowledgement message to the wireless communication device. The wireless communication device may receive the first acknowledgement message from the wireless communication node after the second SP, according to the one or more request frames.

In one approach, the present disclosure is directed to a method for coordinating, configuring, and/or synchronizing periods to perform and/or receive transmissions, according to one or more request frames. A wireless communication device may transmit one or more frames to a wireless communication node and a wireless user device. The one or more frames may indicate to the wireless communication node to perform a first transmission to the wireless communication device during a first duration. The one or more frames may indicate to the wireless user device to perform a second transmission to the wireless communication device during the first duration.

During the first duration, the wireless communication device may receive according to the one or more frames, the first transmission from the wireless communication node, and the second transmission from the wireless user device. After the first duration, the wireless communication device may transmit a first acknowledgement message to the wireless communication node, and a second acknowledgement message to the wireless user device. During a second duration that is non-overlapping with the first duration, the wireless communication device may perform a third transmission to the wireless communication node, and a fourth transmission to the wireless user device. After the second duration, the wireless communication device may receive a third acknowledgement message from the wireless communication node, and a fourth acknowledgement message from the wireless user device.

In one approach, the present disclosure is directed to a wireless communication device including one or more processors. The one or more processors may transmit one or more first request frames to a wireless communication node and a wireless user device. The one or more first request frames may indicate to the wireless communication node to perform a first transmission to the wireless communication device during a first service period (SP). The one or more first request frames may indicate to the wireless user device to perform a second transmission to the wireless communication device during the first SP. The one or more processors may receive, during the first SP, according to the one or more first request frames, the first transmission from the wireless communication node, and the second transmission from the wireless user device.

In some embodiments, the one or more first request frames may include a field indicating that the first SP is used for downlink only. In some embodiments, the one or more processors may be further configured to transmit, after the first SP, according to the one or more first request frames, a first acknowledgement message to the wireless communication node, and a second acknowledgement message to the wireless user device. The one or more first request frames may include a field indicating that acknowledgement messages are to be transmitted after the first SP.

In some embodiments, the one or more processors may be configured to transmit one or more second request frames to the wireless communication node and the wireless user device. The one or more second request frames may indicate to the wireless communication node to receive a third transmission from the wireless communication device during a second SP that is non-overlapping with the first SP, and to transmit a third acknowledgement message to the wireless communication device after the second SP. The one or more second request frames may indicate to the wireless user device to receive a fourth transmission from the wireless communication device during the second SP, and to transmit a fourth acknowledgement message to the wireless communication device after the second SP. The one or more processors may be configured to perform, during the second SP, according to the one or more second request frames, the third transmission to the wireless communication node, and the fourth transmission to the wireless user device.

In some embodiments, the one or more second request frames may include a field indicating that the second SP is used for uplink only. In some embodiments, the one or more processors may be further configured to receive, after the second SP, according to the one or more second request frames, the third acknowledgement message from the wireless communication node, and the fourth acknowledgement message from the wireless user device.

Figure 2:
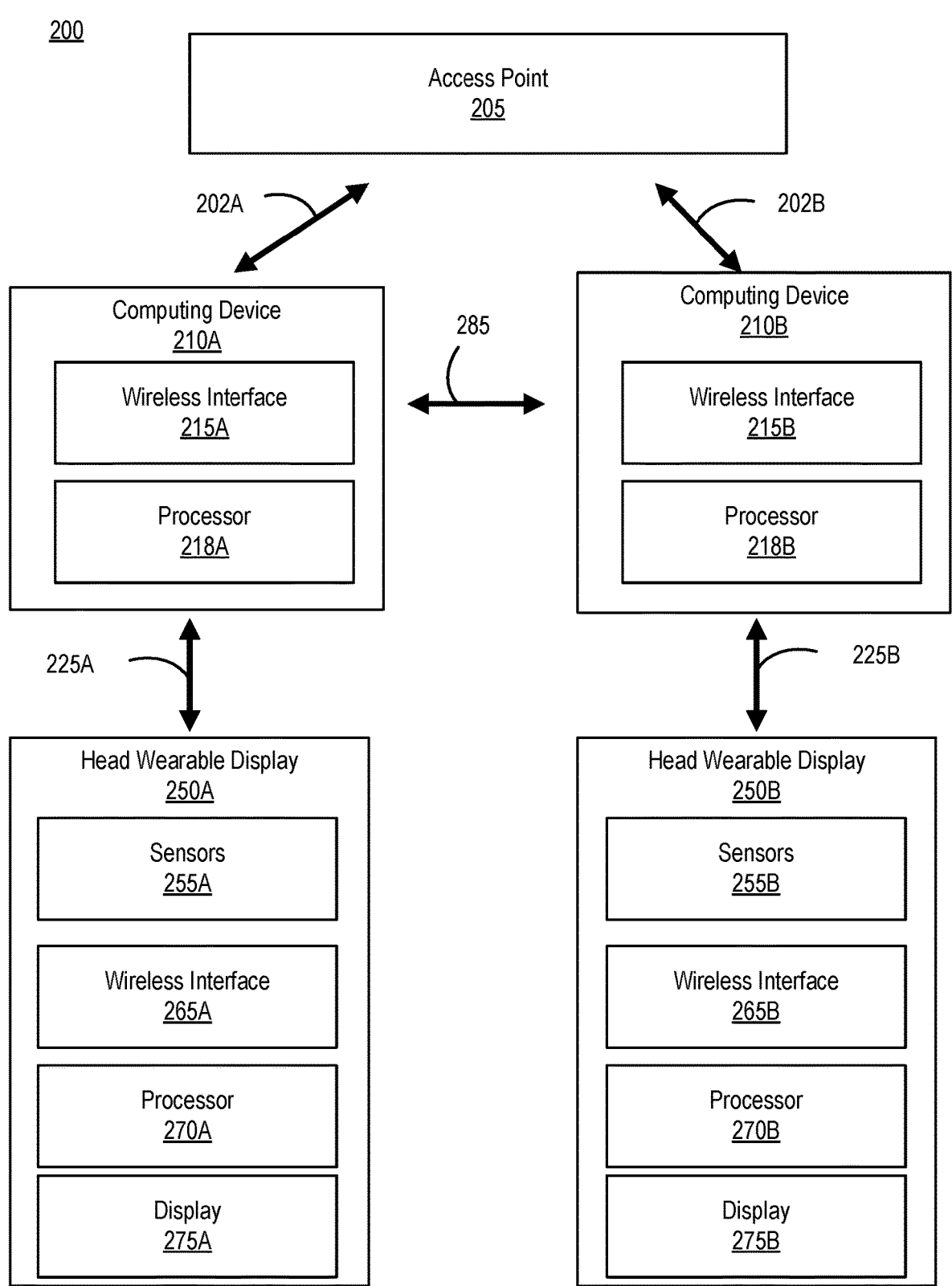
FIG. 2 is a diagram of a system environment including an artificial reality system, according to an example implementation of the present disclosure.

In view of the above discussion regarding coordinating and/or configuring periods for simultaneous transmissions or receptions across a plurality of channels, a process and/or system for performing said coordinating may be beneficial, as further explained in the following passages. FIG. 2 is a block diagram of an example artificial reality system environment 200, in which a wireless communication device can coordinate SPs or durations for simultaneous transmissions/receptions, according to one or more frames (e.g., trigger frames, RDG grants, and/or other types of frames). In some embodiments, the artificial reality system environment 200 includes an access point (AP) 205, one or more HWDs 250 (e.g., HWD 250A, 250B), and one or more computing devices 210 (computing devices 210A, 210B; sometimes referred to as stage devices or consoles) providing data for artificial reality to the one or more HWDs 250. In some embodiments, the wireless communication device (which can coordinate/configure the SPs or durations) may include or correspond to the computing device(s) 210A, 210B. In some embodiments, the wireless user device may include or correspond to the HWDs 250, while the wireless communication node can include or correspond to the AP 205 (or other network devices).

In some embodiments, the wireless user device (e.g., HWD 250) can communicate with a network via the computing/stage device(s) 210 and/or at least one AP 205. In certain embodiments, the wireless communication device may transmit, send, broadcast and/or communicate data/information (e.g., request frames, acknowledgement messages, and/or other transmissions) to the wireless user device and/or the wireless communication node (e.g., uplink (UL) transmissions). For example, the wireless communication device may send and/or transmit one or more request frames (e.g., UL transmissions) to the wireless communication node and/or the wireless user device (e.g., to perform transmissions/receptions during and/or after a SP). In certain embodiments, the wireless communication device may receive and/or obtain data/information (e.g., acknowledgement messages, and/or other transmissions) from the wireless user device and/or the wireless communication node (e.g., downlink (DL) transmissions). For example, the wireless communication device may receive transmissions and/or acknowledgement messages (e.g., DL transmissions) from the wireless user device and/or the wireless communication node, according to (or based on) the request frame(s).

In certain embodiments, the access point 205 may be a router or any network device allowing one or more computing devices 210 and/or one or more HWDs 250 to access a network (e.g., the Internet). The access point 205 may be replaced by any communication device (cell site). A computing device 210 may be a custom device or a mobile device that can retrieve content from the access point 205, and provide image data of artificial reality to a corresponding HWD 250. Each HWD 250 may present the image of the artificial reality to a user according to the image data. In some embodiments, the artificial reality system environment 200 includes more, fewer, or different components than shown in FIG. 2. In some embodiments, the computing devices 210A, 210B communicate with the access point 205 through wireless links 202A, 202B (e.g., interlinks), respectively. In some embodiments, the computing device 210A communicates with the HWD 250A through a wireless link 225A (e.g., intralink), and the computing device 210B communicates with the HWD 250B through a wireless link 225B (e.g., intralink). In some embodiments, functionality of one or more components of the artificial reality system environment 200 can be distributed among the components in a different manner than is described here. For example, some of the functionality of the computing device 210 may be performed by the HWD 250. For example, some of the functionality of the HWD 250 may be performed by the computing device 210.

In some embodiments, the HWD 250 is an electronic component that can be worn by a user and can present or provide an artificial reality experience to the user. The HWD 250 may be referred to as, include, or be part of a head mounted display (HMD), head mounted device (HMD), head wearable device (HWD), head worn display (HWD) or head worn device (HWD). The HWD 250 may render one or more images, video, audio, or some combination thereof to provide the artificial reality experience to the user. In some embodiments, audio is presented via an external device (e.g., speakers and/or headphones) that receives audio information from the HWD 250, the computing device 210, or both, and presents audio based on the audio information. In some embodiments, the HWD 250 includes sensors 255, a wireless interface 265, a processor 270, and a display 275. These components may operate together to detect a location of the HWD 250 and a gaze direction of the user wearing the HWD 250, and render an image of a view within the artificial reality corresponding to the detected location and/or orientation of the HWD 250. In other embodiments, the HWD 250 includes more, fewer, or different components than shown in FIG. 2.

In some embodiments, the sensors 255 include electronic components or a combination of electronic components and software components that detects a location and an orientation of the HWD 250. Examples of the sensors 255 can include: one or more imaging sensors, one or more accelerometers, one or more gyroscopes, one or more magnetometers, or another suitable type of sensor that detects motion and/or location. For example, one or more accelerometers can measure translational movement (e.g., forward/back, up/down, left/right) and one or more gyroscopes can measure rotational movement (e.g., pitch, yaw, roll). In some embodiments, the sensors 255 detect the translational movement and the rotational movement, and determine an orientation and location of the HWD 250. In one aspect, the sensors 255 can detect the translational movement and the rotational movement with respect to a previous orientation and location of the HWD 250, and determine a new orientation and/or location of the HWD 250 by accumulating or integrating the detected translational movement and/or the rotational movement. Assuming for an example that the HWD 250 is oriented in a direction 25 degrees from a reference direction, in response to detecting that the HWD 250 has rotated 20 degrees, the sensors 255 may determine that the HWD 250 now faces or is oriented in a direction 45 degrees from the reference direction. Assuming for another example that the HWD 250 was located two feet away from a reference point in a first direction, in response to detecting that the HWD 250 has moved three feet in a second direction, the sensors 255 may determine that the HWD 250 is now located at a vector multiplication of the two feet in the first direction and the three feet in the second direction.

In some embodiments, the wireless interface 265 includes an electronic component or a combination of an electronic component and a software component that communicates with the computing device 210. In some embodiments, the wireless interface 265 includes or is embodied as a transceiver for transmitting and receiving data through a wireless medium. The wireless interface 265 may communicate with a wireless interface 215 of a corresponding computing device 210 through a wireless link 225 (e.g., intralink). The wireless interface 265 may also communicate with the access point 205 through a wireless link (e.g., interlink). Examples of the wireless link 225 include a near field communication link, Wi-Fi direct, Bluetooth, or any wireless communication link. Through the wireless link 225, the wireless interface 265 may transmit to the computing device 210 data indicating the determined location and/or orientation of the HWD 250, the determined gaze direction of the user, and/or hand tracking measurement. Moreover, through the wireless link 225, the wireless interface 265 may receive from the computing device 210 image data indicating or corresponding to an image to be rendered.

In some embodiments, the processor 270 includes an electronic component or a combination of an electronic component and a software component that generates one or more images for display, for example, according to a change in view of the space of the artificial reality. In some embodiments, the processor 270 is implemented as one or more graphical processing units (GPUs), one or more central processing unit (CPUs), or a combination of them that can execute instructions to perform various functions described herein. The processor 270 may receive, through the wireless interface 265, image data describing an image of artificial reality to be rendered, and render the image through the display 275. In some embodiments, the image data from the computing device 210 may be encoded, and the processor 270 may decode the image data to render the image. In some embodiments, the processor 270 receives, from the computing device 210 through the wireless interface 265, object information indicating virtual objects in the artificial reality space and depth information indicating depth (or distances from the HWD 250) of the virtual objects. In one aspect, according to the image of the artificial reality, object information, depth information from the computing device 210, and/or updated sensor measurements from the sensors 255, the processor 270 may perform shading, reprojection, and/or blending to update the image of the artificial reality to correspond to the updated location and/or orientation of the HWD 250.

In some embodiments, the display 275 is an electronic component that displays an image. The display 275 may, for example, be a liquid crystal display or an organic light emitting diode display. The display 275 may be a transparent display that allows the user to see through. In some embodiments, when the HWD 250 is worn by a user, the display 275 is located proximate (e.g., less than 3 inches) to the user's eyes. In one aspect, the display 275 emits or projects light towards the user's eyes according to image generated by the processor 270. The HWD 250 may include a lens that allows the user to see the display 275 in a close proximity.

In some embodiments, the processor 270 performs compensation to compensate for any distortions or aberrations. In one aspect, the lens introduces optical aberrations such as a chromatic aberration, a pin-cushion distortion, barrel distortion, etc. The processor 270 may determine a compensation (e.g., predistortion) to apply to the image to be rendered to compensate for the distortions caused by the lens, and apply the determined compensation to the image from the processor 270. The processor 270 may provide the predistorted image to the display 275.

In some embodiments, the computing device 210 is an electronic component or a combination of an electronic component and a software component that provides content to be rendered to the HWD 250. The computing device 210 may be embodied as a mobile device (e.g., smart phone, tablet PC, laptop, etc.). The computing device 210 may operate as a soft access point. In one aspect, the computing device 210 includes a wireless interface 215 and a processor 218. These components may operate together to determine a view (e.g., a FOV of the user) of the artificial reality corresponding to the location of the HWD 250 and the gaze direction of the user of the HWD 250, and can generate image data indicating an image of the artificial reality corresponding to the determined view. The computing device 210 may also communicate with the access point 205, and may obtain AR/VR content from the access point 205, for example, through the wireless link 202 (e.g., interlink). The computing device 210 may receive sensor measurement indicating location and the gaze direction of the user of the HWD 250 and provide the image data to the HWD 250 for presentation of the artificial reality, for example, through the wireless link 225 (e.g., intralink). In other embodiments, the computing device 210 includes more, fewer, or different components than shown in FIG. 2.

In some embodiments, the wireless interface 215 is an electronic component or a combination of an electronic component and a software component that communicates with the HWD 250, the access point 205, other computing device 210, or any combination of them. In some embodiments, the wireless interface 215 includes or is embodied as a transceiver for transmitting and receiving data through a wireless medium. The wireless interface 215 may be a counterpart component to the wireless interface 265 to communicate with the HWD 250 through a wireless link 225 (e.g., intralink). The wireless interface 215 may also include a component to communicate with the access point 205 through a wireless link 202 (e.g., interlink). Examples of wireless link 202 include a cellular communication link, a near field communication link, Wi-Fi, Bluetooth, 60 GHz wireless link, or any wireless communication link. The wireless interface 215 may also include a component to communicate with a different computing device 210 through a wireless link 285. Examples of the wireless link 285 include a near field communication link, Wi-Fi direct, Bluetooth, or any wireless communication link. Through the wireless link 202 (e.g., interlink), the wireless interface 215 may obtain AR/VR content, or other content from the access point 205. Through the wireless link 225 (e.g., intralink), the wireless interface 215 may receive from the HWD 250 data indicating the determined location and/or orientation of the HWD 250, the determined gaze direction of the user, and/or the hand tracking measurement. Moreover, through the wireless link 225 (e.g., intralink), the wireless interface 215 may transmit to the HWD 250 image data describing an image to be rendered. Through the wireless link 285, the wireless interface 215 may receive or transmit information indicating the wireless link 225 (e.g., channel, timing) between the computing device 210 and the HWD 250. According to the information indicating the wireless link 225, computing devices 210 may coordinate or schedule operations to avoid interference or collisions.

The processor 218 can include or correspond to a component that generates content to be rendered according to the location and/or orientation of the HWD 250. In some embodiments, the processor 218 includes or is embodied as one or more central processing units, graphics processing units, image processors, or any processors for generating images of the artificial reality. In some embodiments, the processor 218 may incorporate the gaze direction of the user of the HWD 250 and a user interaction in the artificial reality to generate the content to be rendered. In one aspect, the processor 218 determines a view of the artificial reality according to the location and/or orientation of the HWD 250. For example, the processor 218 maps the location of the HWD 250 in a physical space to a location within an artificial reality space, and determines a view of the artificial reality space along a direction corresponding to the mapped orientation from the mapped location in the artificial reality space. The processor 218 may generate image data describing an image of the determined view of the artificial reality space, and transmit the image data to the HWD 250 through the wireless interface 215. The processor 218 may encode the image data describing the image, and can transmit the encoded data to the HWD 250. In some embodiments, the processor 218 generates and provides the image data to the HWD 250 periodically (e.g., every 11 ms or 16 ms).

In some embodiments, the processors 218, 270 may configure or cause the wireless interfaces 215, 265 to toggle, transition, cycle or switch between a sleep mode and a wake up mode. In the wake up mode, the processor 218 may enable the wireless interface 215 and the processor 270 may enable the wireless interface 265, such that the wireless interfaces 215, 265 may exchange data. In the sleep mode, the processor 218 may disable (e.g., implement low power operation in) the wireless interface 215 and the processor 270 may disable the wireless interface 265, such that the wireless interfaces 215, 265 may not consume power or may reduce power consumption. The processors 218, 270 may schedule the wireless interfaces 215, 265 to switch between the sleep mode and the wake up mode periodically every frame time (e.g., 11 ms or 16 ms). For example, the wireless interfaces 215, 265 may operate in the wake up mode for 2 ms of the frame time, and the wireless interfaces 215, 265 may operate in the sleep mode for the remainder (e.g., 9 ms) of the frame time. By disabling the wireless interfaces 215, 265 in the sleep mode, power consumption of the computing device 210 and the HWD 250 can be reduced.

Figure 3:
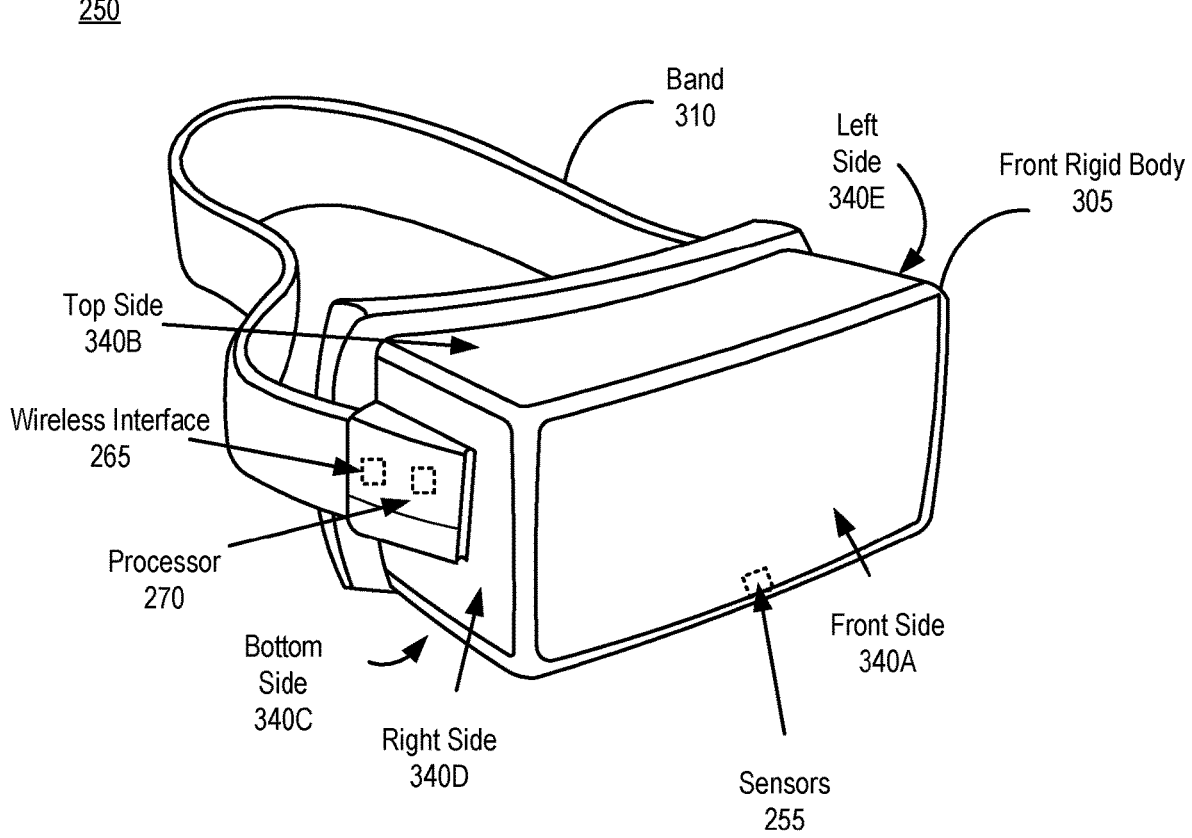
FIG. 3 is a diagram of a head wearable display, according to an example implementation of the present disclosure.

FIG. 3 is a diagram of a HWD 250, in accordance with an example embodiment. In some embodiments, the HWD 250 includes a front rigid body 305 and a band 310. The front rigid body 305 includes the display 275 (not shown in FIG. 3), the lens (not shown in FIG. 3), the sensors 255, the wireless interface 265, and the processor 270. In the embodiment shown by FIG. 3, the wireless interface 265, the processor 270, and the sensors 255 are located within the front rigid body 305, and may not visible to the user. In other embodiments, the HWD 250 has a different configuration than shown in FIG. 3. For example, the wireless interface 265, the processor 270, and/or the sensors 255 may be in different locations than shown in FIG. 3.

In view of the above discussion regarding a system (e.g., artificial reality system 200) in which simultaneous transmissions or receptions (e.g., between a wireless communication device, a wireless user device, and/or a wireless communication node) can be coordinated (e.g., across a plurality of channels), a process and/or system for performing said coordinating may be beneficial, as further explained in the following passages. For example, the systems and methods described herein include a novel approach for supporting and/or enabling coordinated simultaneous transmissions (e.g., Tx+Tx) and/or coordinated simultaneous receptions (e.g., Rx+Rx) across a plurality of channels (e.g., interlink(s) and intralink(s)), without allowing simultaneous transmissions and receptions (e.g., simultaneous intralink transmissions and interlink receptions).

In some embodiments, the novel approach may include coordinating one or more service periods (SPs), such as a first SP and/or a second SP, for simultaneous transmissions and/or simultaneous receptions across the plurality of channels (e.g., intralink(s) and/or interlink(s)). In certain embodiments, the wireless communication device may coordinate the simultaneous Tx/Rx operations by configuring and/or transmitting one or more request frames to indicate and/or specify the SP(s). Certain features, such as the Target Wake Time (TWT) feature, can be used to define, indicate and/or specify said service period(s) for simultaneous transmissions/receptions (e.g., Tx or Rx only). As such, the one or more request frames can be configured according to (or by using) the TWT feature. In some embodiments, a Tx service period (Tx SP) may specify that a wireless communication device (e.g., computing device 210A, 210B, such as a stage device and/or an AR computing device) can perform simultaneous transmissions across the plurality of channels. As such, request frames that include, specify and/or configure a Tx SP (e.g., a second SP) can indicate that a wireless communication device may transmit/send a transmission (e.g., a third and/or fourth transmission) to the wireless communication node and the wireless user device during the Tx SP. In certain embodiments, a Rx service period (Rx SP), may specify that the wireless communication device can perform simultaneous receptions across the plurality of channels (e.g., during a same time instance). As such, request frames that include, specify and/or configure a Rx SP (e.g., a first SP) can indicate that a wireless communication node and a wireless user device may transmit/send a transmission (e.g., a first and/or second transmission) to the wireless communication device during the Rx SP. In some embodiments, the novel approach may provide mechanisms for configuring, modifying, synchronizing, and/or coordinating the SPs across the plurality of channels. For instance, the novel approach may include one or more mechanisms for ensuring the SPs (e.g., across the plurality of channels) occur over a same time instance/interval.

Figure 4:
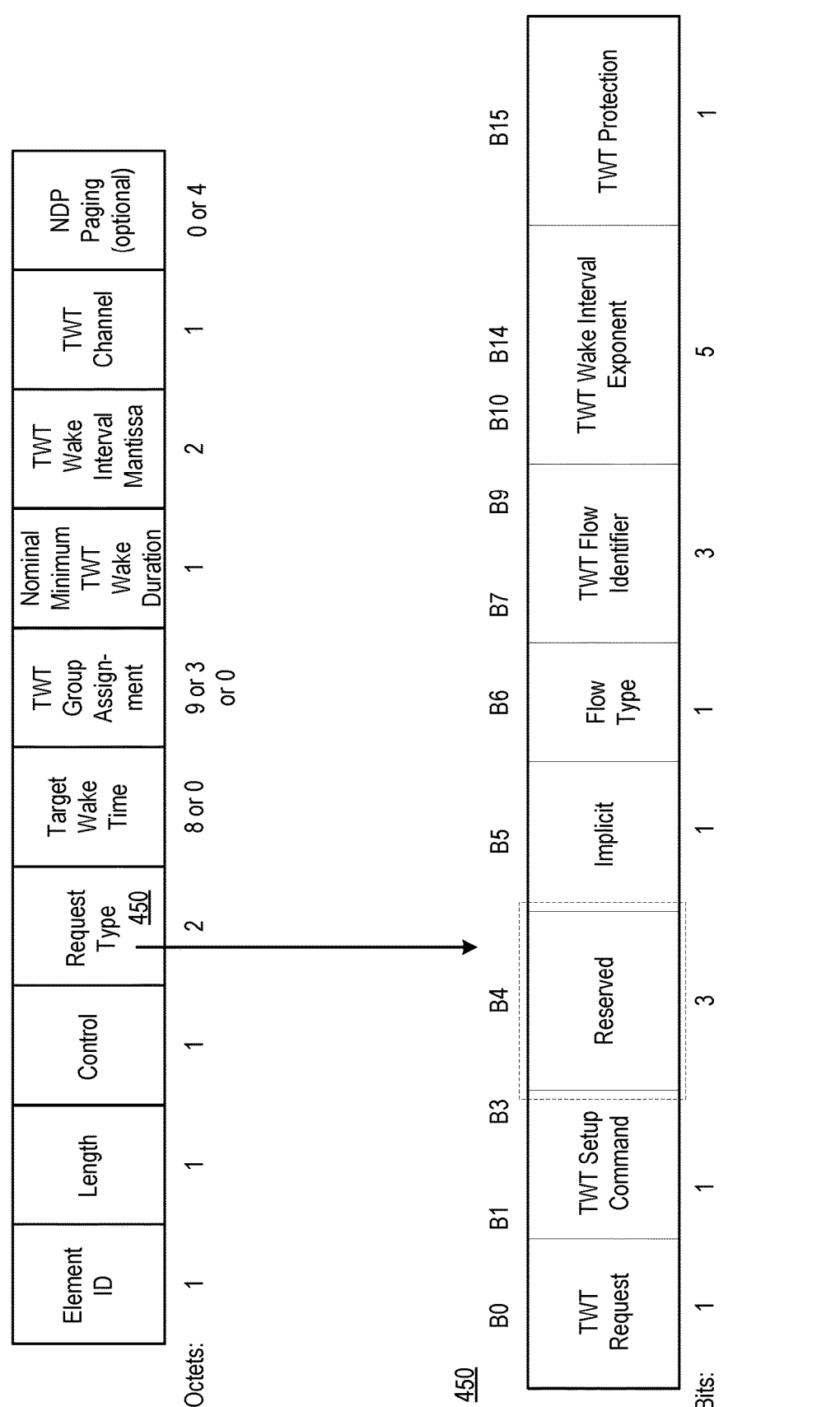
FIG. 4 is a diagram of an example configuration of a TWT feature, according to an example implementation of the present disclosure.

In certain embodiments, the TWT feature may fail to indicate and/or specify a direction of traffic or transmission (e.g., Tx or Rx) for an associated SP. As such, in some embodiments of the systems and methods described herein, a field of the TWT feature (e.g., TWT element format) can be used to define, configure and/or indicate a direction of transmission (e.g., an UL transmission or a DL transmission) via the plurality of channels (e.g., to indicate whether a wireless communication device can only perform Tx operations (e.g., UL transmissions) or Rx operations (e.g., DL transmissions) during a SP). FIG. 4A depicts a TWT element format 400 including a plurality of fields of a TWT feature, according to example implementations of the present disclosure. The plurality of fields may include an "Element ID" field, a "Length" field, a "Control" field, a "Request Type" field 450, a "TWT" field, a "TWT Group Assignment" field, a "Nominal Minimum TWT Wake Duration" field, a "TWT Wake Interval Mantissa" field, a "TWT Channel" field, a "null data packet (NDP) Paging" field, and/or other fields.

In certain embodiments, one or more fields of the TWT feature can be used and/or modified to indicate the direction of the transmission (e.g., UL or DL) of a corresponding SP (e.g., a first SP and/or a second SP). For instance, a "Reserved" bit in a "Request Type" field 450 (or other fields) of the TWT feature (as seen in FIG. 4B) can be modified and/or used to indicate the direction of traffic of an associated SP. In one example, if the "Reserved" bit has a value of 1 (or other values), the associated SP(s) can be used (e.g., by the wireless communication device) for simultaneous receptions (e.g., Rx+Rx mode, or DL transmissions). If, for example, the "Reserved" bit has a value of 0 (or other values), the associated SP(s) may be used for performing simultaneous transmissions (e.g., Tx+Tx mode, or UL transmissions). In one example, the wireless communication device may send/transmit one or more request frames (e.g., configured by using the TWT feature) to the wireless communication node and the wireless user device, in which the request frames are configured to indicate/specify a SP (e.g., a first SP and/or a second SP). In the same example, a "Reserved" bit in a "Request Type" field of the TWT feature (e.g., associated to the SP) may have a value of 1. As such, and according to the request frame(s), the wireless communication device may receive (e.g., Rx+Rx mode, or DL transmissions) one or more transmissions from the wireless communication node and the wireless user device during the SP. In another example, if the "Reserved" bit in the "Request Type" field of the TWT feature (e.g., associated to the SP) has a value of 0, the wireless communication device may send (e.g., Tx+Tx mode, or UL transmissions) one or more transmissions to the wireless communication node and the wireless user device during the SP, according to the request frame(s).

Figure 5:
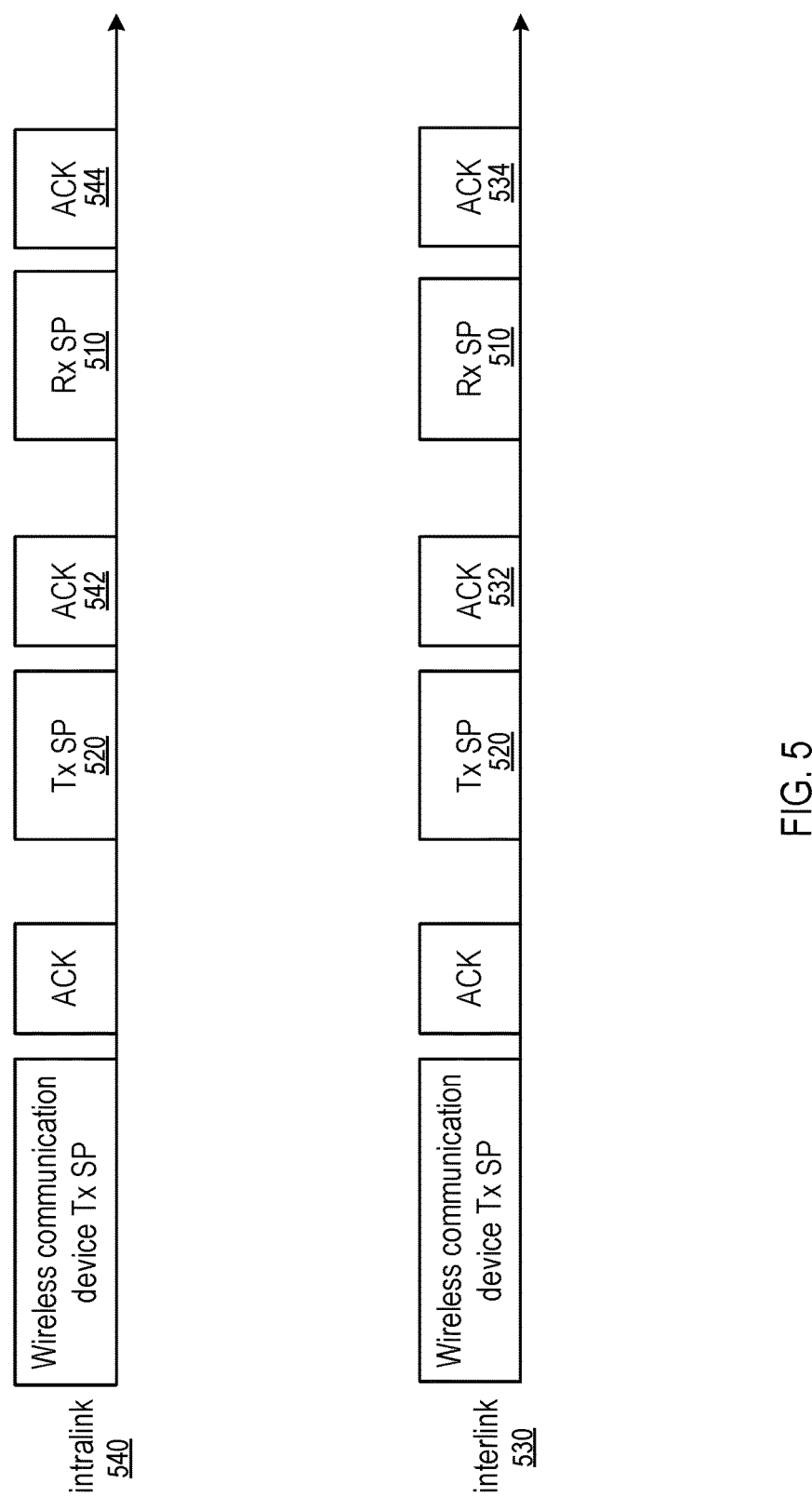
FIG. 5 is a diagram of an example implementation of coordinated Tx and/or Rx operations, according to an example implementation of the present disclosure.

In some embodiments, an acknowledgement (ACK) notification/message can be configured and/or used to coordinate the SPs (e.g., the first SP and/or the second SP) across the plurality of channels. For instance, a wireless communication device may send an ACK message after and/or following a SP. In one example, a wireless communication device may send/transmit acknowledgement messages (e.g., a third acknowledgement message and/or a fourth acknowledgement message) to the wireless communication node and/or the wireless user device, after a first SP. As such, the wireless communication device may send the acknowledgement messages responsive to receiving transmissions during the first SP, for instance. In another example, a wireless communication device may receive/obtain acknowledgement messages (e.g., a first acknowledgement message and/or a second acknowledgement message) from the wireless communication node and the wireless user device, after a SP (e.g., a second SP). As such, the wireless communication device may receive the acknowledgement messages in response to performing transmissions during the second SP, for instance. FIG. 5 depicts an example scenario 500 in which one or more ACK messages are sent and/or received following a SP (e.g., Tx SP and/or Rx SP). As seen in FIG. 5, ACK messages can be used to align one or more SPs, and as such, to coordinate Tx/Rx operations across a plurality of channels. Referring to FIG. 5, a wireless communication device may send/transmit acknowledgement messages (e.g., ACK 542) to a wireless communication node via an interlink 540, after a first SP 510. The wireless communication device may send/transmit acknowledgement messages (e.g., ACK 532) to a wireless user device via an intralink 530, after the first SP 510. As such, the wireless communication device may send the acknowledgement messages (e.g., ACK 532, ACK 542) responsive to receiving transmissions during the first SP 510, for instance. The wireless communication device may receive/obtain acknowledgement messages (e.g., ACK 544) from the wireless communication node via the interlink 540, after a second SP 520. The wireless communication device may receive/obtain acknowledgement messages (e.g., ACK 534) from the wireless user device via the intralink 530, after the second SP 520. As such, the wireless communication device may receive the acknowledgement messages (e.g., ACK 534, ACK 544) in response to performing transmissions during the second SP 520, for instance.

In certain embodiments, sending an ACK message after a SP can avoid/prevent scenarios with simultaneous Tx/Rx operations, in which a wireless communication device receives an ACK message on one channel (e.g., intralink or interlink) while another channel is transmitting. Current ACK policies (e.g., Wi-Fi ACK policies) define an immediate ACK message and/or a delayed ACK message (e.g., ACK message is provided at any time following the SP). In some embodiments of the present disclosure, a delayed deterministic ACK policy may be defined and/or configured to coordinate transmissions of ACK messages across the plurality of channels. The delayed deterministic ACK policy can specify and/or configure a transmission (e.g., by a wireless communication device, a wireless communication node and/or a wireless user device) of a delayed ACK message in a deterministic manner. For instance, according to the delayed deterministic ACK policy, a wireless communication device, wireless communication node, and/or wireless user device can send and/or transmit a delayed ACK message following a SP (e.g., instead of at any time following the SP, as in the delay ACK policy). As such, the delayed deterministic ACK policy can be used to align Tx/Rx operations across the plurality of channels (e.g., see FIG. 5).

In certain embodiments, a type of ACK policy (e.g., immediate ACK message policy, delayed ACK message policy, and/or delayed deterministic ACK message policy) to be used can be configured, specified, and/or indicated according to (or by using) one or more approaches. In one approach, a new field and/or an existing field of the TWT feature (e.g., a "Request Type" field and/or other fields) can be used to indicate the type of ACK policy. In one example, the "Request Type" field can be configured (e.g., to indicate a type of ACK policy) during a TWT set-up. In another approach, an "ACK policy" field (and/or other fields) of a medium access control (MAC) header can be used to configure and/or specify the type of ACK policy. For instance, a "No ACK Policy" value of the "ACK policy" field can be configured (or redefined) to specify that a delayed deterministic ACK policy is to be used when coordinating Tx/Rx operations across a plurality of channels. When the delayed deterministic ACK policy is indicated (e.g., in a MAC header of the current packet), it means the current packet can be acknowledged with the delayed deterministic ACK policy, e.g., ACK is to be sent after the current SP.

In some embodiments of the present disclosure, the systems and methods described herein include a novel approach for defining an operating mode that allows the wireless communication device (e.g., a computing device 210) to determine, define and/or control the time and/or duration of transmissions (e.g., Tx) from a wireless communication node (e.g., an AP 205) and/or a wireless user device (e.g., a HWD 250). In such an operating mode, the wireless communication node, for example, may be unable to transmit data to the wireless communication device without receiving permission (e.g., by the wireless communication device) to transmit. The wireless communication node, for instance, can receive and/or obtain permission via one or more methods. At least one method may include modifying and/or configuring a feature (e.g., a reverse direction grant (RDG) feature and/or other features) to include and/or provide a permission to transmit, a time of the transmission, and/or a duration of the transmission (e.g., a first duration). In one example, a wireless communication device can send and/or transmit one or more frames (e.g., RDG frames and/or trigger frames) to provide the permission to transmit, the time of the transmission, and/or the duration of the transmission (e.g., to the wireless communication node and/or a wireless user device). The wireless communication device, for instance, can use a RDG frame and/or a trigger frame to provide a permission to transmit to a wireless communication node, in addition to a time of the transmission and/or a duration of the transmission.

Figure 6:
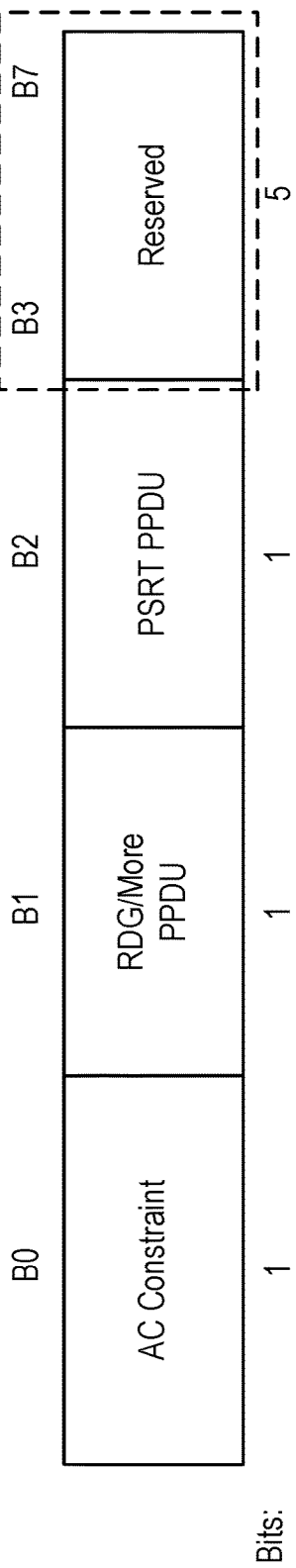
FIG. 6 is a diagram of an example configuration of a MAC header, according to an example implementation of the present disclosure.

In some embodiments, the wireless communication device can use a MAC header field to indicate a RDG grant. A "Reserved" field (and/or other fields) of the MAC header can be used and/or configured as a "RDG Duration" field. The "RDG Duration" field can specify (e.g., to a wireless communication node and/or a wireless user device) a duration (e.g., a first duration) of the transmission (e.g., a duration of the RDG grant). FIG. 6 depicts an example configuration of a MAC header that includes one or more fields, such as the "Reserved" field for specifying a duration of a transmission.

In some embodiments, at least one method for obtaining and/or granting permission to perform a transmission may include defining a client operating mode. In the client operating mode, the wireless communication node and/or the wireless user device may be unable to transmit data to the wireless communication device until the wireless communication node and/or the wireless user device is/are triggered (e.g., using a frame, such as a trigger frame) by the wireless communication device. In one example, the wireless communication device can transmit one or more frames (e.g., one or more trigger frames) to the wireless communication node, wherein the frames(s) can indicate to the wireless communication node to perform a first transmission (e.g., grant permission to perform a first transmission) to the wireless communication device during a time duration (e.g., a first duration). In another example, the wireless communication device can transmit one or more frames (e.g., one or more trigger frames) to the wireless user device, wherein the frames(s) can indicate to the wireless user device to perform a second transmission (e.g., grant permission to perform a second transmission) to the wireless communication device during a same/overlapping time duration (e.g., a first duration).

In certain embodiments, the wireless communication node may trigger the wireless communication device to transmit data, but the wireless communication device may be unable to trigger the wireless communication node for data transmissions. The systems and methods described herein include mechanisms for allowing the wireless communication device to trigger the wireless communication node (and/or the wireless user device) to perform a transmission. As discussed, one or more operating modes can be configured, wherein the one or more operating modes can allow a wireless communication device (or other devices) to control a time of transmission and/or a duration of transmissions from the wireless communication node and/or a wireless user device, for example. The one or more operating modes can be used (or otherwise enabled) during a set of one or more SPs and/or during a preconfigured operating time (e.g., unless the operating mode is disabled).

Figure 7:
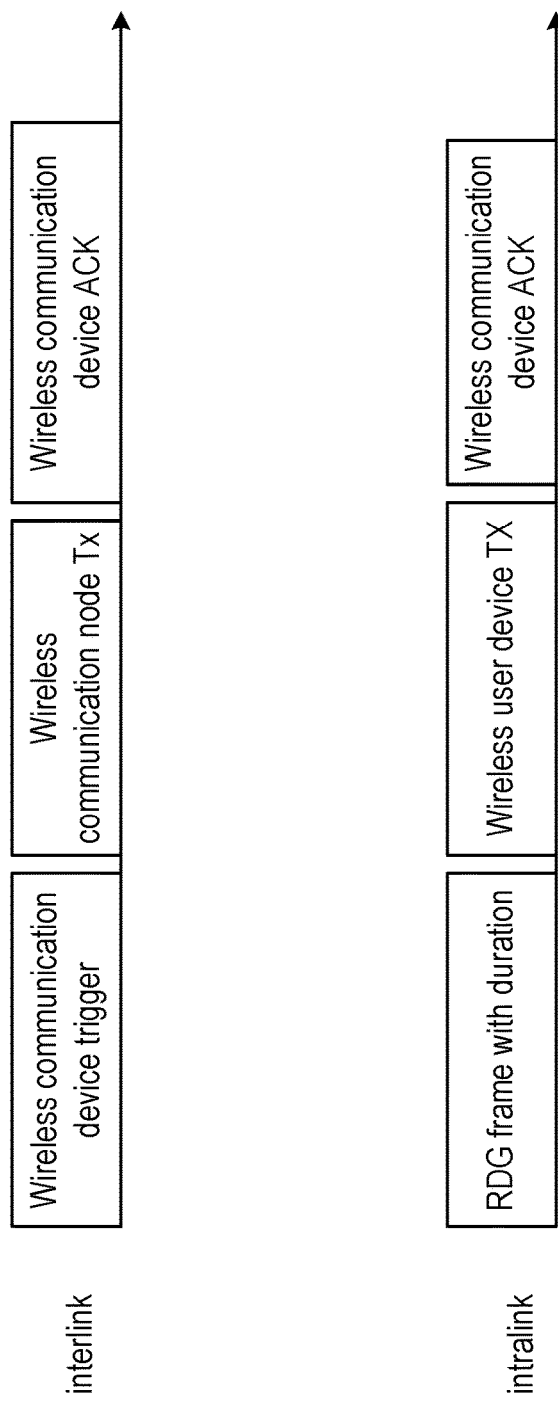
FIG. 7 is a diagram of an example implementation of coordinated Tx and/or Rx operations, according to an example implementation of the present disclosure.

In certain embodiments, ACK messages (e.g., ACK messages after and/or following a transmission performed by a wireless communication node and/or a wireless user device) can be used to coordinate simultaneous transmissions (e.g., from a wireless communication node and/or a wireless user device) across a plurality of channels (e.g., intralink and interlink). As seen in FIG. 7, the wireless communication device can use a trigger frame and/or a RDG frame to allow the wireless communication node (e.g., interlink) and/or the wireless user device (e.g., intralink) to perform transmissions. The wireless communication device can use the trigger frame and/or RDG frame to specify, indicate, define and/or control the time and/or duration of transmissions (e.g., Tx) from the wireless communication node (e.g., an AP 205) and/or the wireless user device (e.g., a HWD 250). Responsive to receiving the one or more frames (e.g., trigger frame(s) and/or RDG frame(s)), the wireless communication node and/or the wireless user device may perform the transmissions (e.g., wireless communication node Tx and/or wireless user device Tx). Responsive to receiving the transmissions from the wireless communication node and/or the wireless user device, the wireless communication device may transmit ACK messages (e.g., in the same/overlapping duration) to align the transmissions across the plurality of channels.

Figure 8:
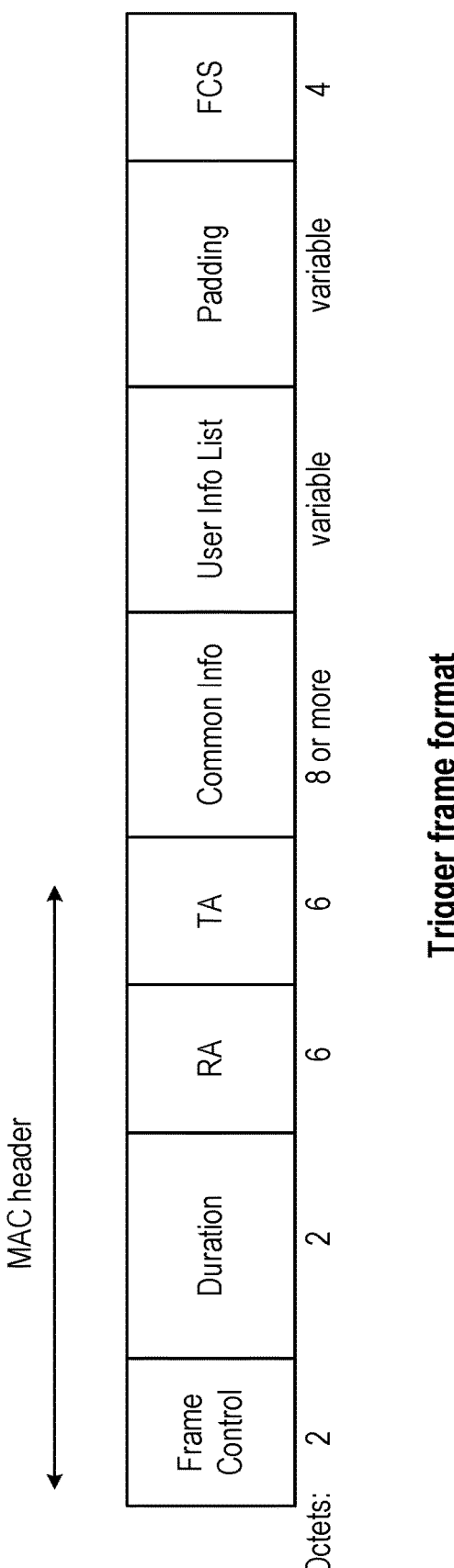
FIG. 8 is a diagram of an example configuration of a trigger frame, according to an example implementation of the present disclosure.

FIG. 8 illustrates an example configuration of a trigger frame, according to example implementations of the present disclosure. In one example, the trigger frame may include one or more fields, such as a "Frame Control" field, a "Duration" field, a "RA" field, a "TA" field, a "Common Info" field, a "User Info List" field, a "Padding" field, a "FCS" field, and/or other fields. In certain embodiments, one or more fields of the trigger frame can be used to specify, indicate and/or configure a duration (e.g., a first duration) of transmissions (e.g., from the wireless communication node and/or the wireless user device). For instance, a "Common Info" field can define the duration of transmissions, while the "User Info List" field can specify one or more Tx parameters for following/triggered transmissions (e.g., after a trigger frame).

In some embodiments, the wireless communication device may use packet padding to ensure one or more transmissions (e.g., via an interlink and an intralink) start and end at the same time (e.g., ACK messages are sent at the same time). As such, packet padding can be used to align and/or coordinate the transmission time of a plurality of transmissions across the plurality of channels.

In certain embodiments, the wireless communication device, the wireless user device and/or the wireless communication node may indicate/specify (e.g., to each other) a capability to perform a method for coordinating simultaneous transmissions (as disclosed herein). For instance, the wireless communication device, the wireless user device and/or the wireless communication node may specify to each other whether each is able to coordinate Tx/Rx operations (e.g., across a plurality of channels) according to (or by using) a TWT feature, a RDG grant, and/or a trigger frame. Each of the wireless communication device, the wireless user device and/or the wireless communication node can indicate a capability (e.g., to each other) during a device association process. The devices/nodes may indicate a corresponding capability by using at least one frame, such as an association request frame, an association response frame, a beacon frame, a probe request frame, a probe response frame, and/or other types of frames.

Figure 9:
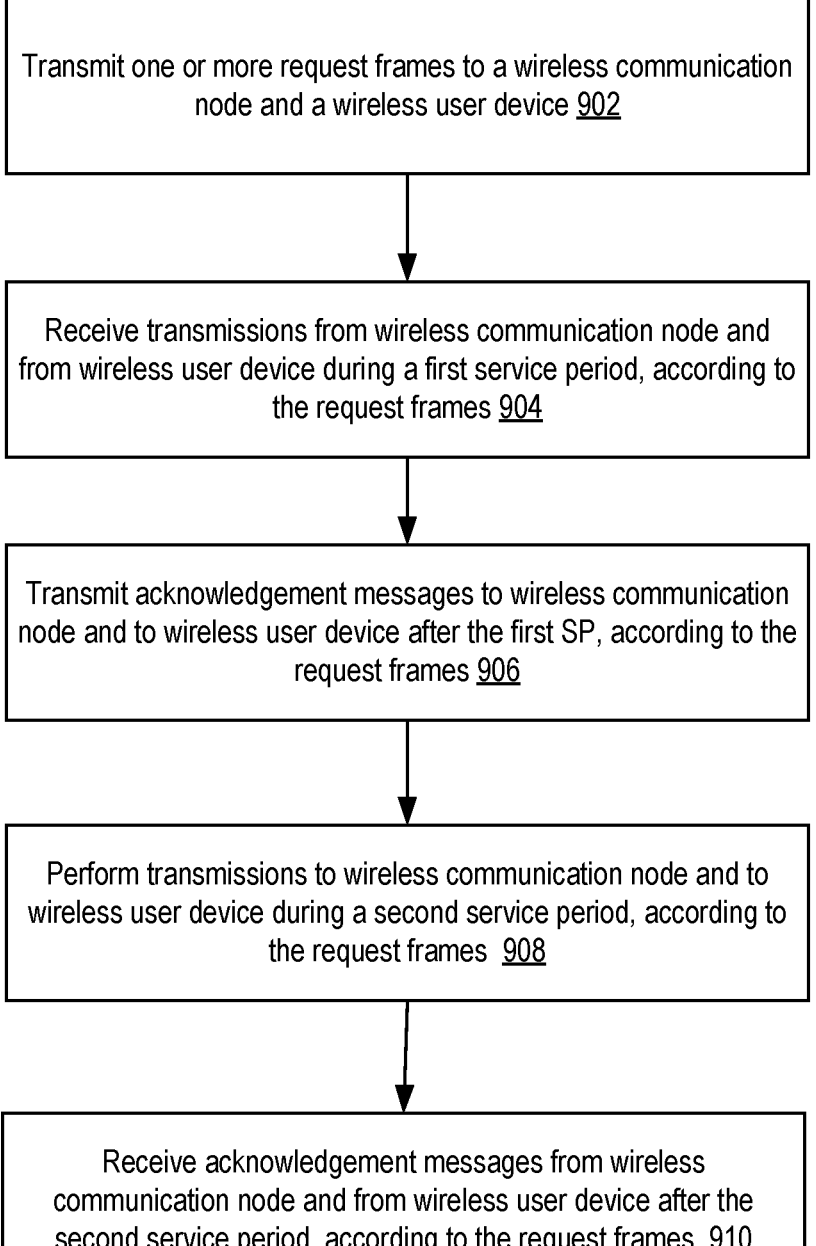

FIG. 9 is a flow diagram of one embodiment of a process 900 for coordinating and/or configuring simultaneous (or overlapping) Tx or Rx operations across a plurality of channels, according to an example implementation of the present disclosure. The functionalities of the process 900 may be implemented using, or performed by, the components detailed herein in connection with FIGS. 1-8. In some embodiments, the process 900 can be performed by a computing device 210 (e.g., computing device 210A and/or computing device 210B). In some embodiments, the process 900 may include more, fewer, or different steps than shown in FIG. 9.

In brief overview, the process 900 can include transmitting one or more request frames to a wireless communication node and/or a wireless user device (902). The process 900 may include receiving transmissions from the wireless communication node and/or the wireless user device during a first SP, according to the request frame(s) (904). The process 900 may include transmitting acknowledgement messages to the wireless communication node and/or the wireless user device after the first SP, according to the request frame(s) (906). The process 900 may include performing transmissions to the wireless communication node and/or the wireless user device during a second service period, according to the request frame(s) (908). The process 900 may include receiving acknowledgement messages from the wireless communication node and/or the wireless user device after the second service period, according to the request frames (910).

Referring now to operation (902), and in some embodiments, the wireless communication device (e.g., a console, a mobile device, a stage device, and/or a computing device 210) may transmit, send, broadcast and/or communicate one or more request frames to the wireless user device (e.g., HWD 225, glasses) and/or the wireless communication node (e.g., AP 205, router). For instance, the wireless communication device may send a same/single request frame to the wireless user device and/or the wireless communication node. In one example, the wireless communication device may send separate and/or distinct request frames to each of the wireless user device and/or the wireless communication node. In some embodiments, the one or more request frames may indicate and/or specify a transmission direction (e.g., Tx mode or Rx mode). For example, the one or more request frames (e.g., TWT frames and/or other types of frames) may indicate and/or instruct to the wireless communication node to perform a first transmission to the wireless communication device (e.g., DL transmission via the interlink). The request frame(s) may indicate to the wireless communication node to perform the transmission during a first SP.

In some embodiments, the request frame(s) may indicate and/or specify to the wireless user device to perform a second transmission to the wireless communication device (e.g., DL transmission via the intralink). The request frame(s) may indicate to the wireless user device to perform the transmission during the first SP. As such, the wireless communication node and the wireless user device may perform simultaneous Tx operations (e.g., via the interlink and intralink) to the wireless communication device during the first SP, according to the request frame(s). In some embodiments, the one or more request frames may indicate and/or specify to the wireless communication node to receive a third transmission from the wireless communication device (e.g., UL transmission via the interlink). The request frame(s) may indicate to the wireless communication node to receive the transmission during a second SP. In some embodiments, the second SP can be non-overlapping with the first SP (e.g., Tx and Rx operations do not occur simultaneously, or in a same SP). In certain embodiments, the request frame(s) may indicate to the wireless communication node to transmit a first ACK message (e.g., in a same duration) to the wireless communication device after the second SP (e.g., delayed deterministic ACK policy).

In some embodiments, the one or more request frames may indicate to the wireless user device to receive a fourth transmission from the wireless communication device (e.g., UL transmission via the intralink). The request frame(s) may indicate to the wireless user device to receive the transmissions during the second SP (e.g., non-overlapping with the first SP). In certain embodiments, the request frame(s) may indicate to the wireless user device to transmit and/or send a second ACK message to the wireless communication device after the second SP (e.g., after and/or following fourth transmission). As such, the SPs (e.g. first SP and/or second SP) being non-overlapping with the ACK messages (e.g., first ACK message and/or second ACK messages) can enable simultaneous, coordinated and/or aligned Tx or Rx operations across the plurality of channels.

In some embodiments, and during the first SP, the wireless communication device may receive and/or obtain transmissions from the wireless communication node and/or the wireless user device (904). According to the request frame(s), the wireless communication device may receive the first transmission from the wireless communication node (e.g., during the first SP). In certain embodiments, the wireless communication device may receive the second transmission from the wireless user device, according to the request frame(s). As such, the wireless communication device may receive simultaneous transmissions (e.g., during a same SP) via the interlink and the intralink from the wireless user device and the wireless communication node. After the first SP, and according to the request frame(s), the wireless communication device may transmit, send, and/or communicate acknowledgement messages to the wireless user device and/or the wireless communication node (906). As such, the wireless communication device may send a third ACK message to the wireless communication node, responsive to receiving the first transmission. Furthermore, the wireless communication device may send a fourth ACK message to the wireless user device, responsive to receiving the second transmission. Indeed, the ACK messages (e.g., third ACK message and/or fourth ACK message) can be aligned in time, and can enable simultaneous, coordinated and/or aligned Rx operations (e.g., Rx operations performed by the wireless communication device) across the plurality of channels.

During the second SP, and according to the request frame(s), the wireless communication device may perform transmissions to the wireless communication node and/or the wireless user device (908). For example, the wireless communication device may perform the third transmission to the wireless communication node. In certain embodiments, the wireless communication device may perform the fourth transmission to the wireless user device. As such, the wireless communication device may perform simultaneous transmissions (e.g., during a same SP) via the interlink and the intralink to the wireless user device and the wireless communication node. After the second SP, and according to the request frame(s), the wireless communication device may receive and/or obtain ACK messages from the wireless communication node and/or the wireless user device (910). As such, the wireless communication device may receive the first acknowledgement message from the wireless communication node, responsive to performing the third transmission. Furthermore, the wireless communication device may receive the second acknowledgement message from the wireless user device, responsive to performing the fourth transmission. Indeed, the ACK messages (e.g., first ACK message and/or second ACK message) can be aligned in time and can enable simultaneous, coordinated and/or aligned Tx operations (e.g., Tx operations performed by the wireless communication device) across the plurality of channels.

FIG. 10 is a flow diagram of one embodiment of a process 1000 for coordinating and/or configuring simultaneous (or overlapping) Tx or Rx operations across a plurality of channels, according to an example implementation of the present disclosure. The functionalities of the process 1000 may be implemented using, or performed by, the components detailed herein in connection with FIGS. 1-8. In some embodiments, the process 1000 can be performed by a computing device 210 (e.g., computing device 210A and/or computing device 210B). In some embodiments, the process 1000 may include more, fewer, or different steps than shown in FIG. 10.

In brief overview, the process 1000 can include transmitting one or more frames to a wireless communication node and/or a wireless user device (1002). The process 1000 may include receiving transmissions from the wireless communication node and/or the wireless user device during a first duration, according to the frame(s) (1004). The process 1000 may include transmitting acknowledgement messages to the wireless communication node and/or the wireless user device after the first duration (1006). The process 1000 may include performing transmissions to the wireless communication node and/or the wireless user device during a second duration (1008). The process 1000 may include receiving acknowledgement messages from the wireless communication node and/or the wireless user device after the second duration (1010).

Referring now to operation (1002), and in some embodiments, the wireless communication device (e.g., a console, a mobile device, a stage device, and/or a computing device 210) may transmit, send, broadcast and/or communicate one or more frames to the wireless user device (e.g., HWD 225) and/or the wireless communication node (e.g., AP 205). For instance, the wireless communication device may send a same/single frame to the wireless user device and/or the wireless communication node. In one example, the wireless communication device may send separate and/or distinct frames to each of the wireless user device and/or the wireless communication node. In some embodiments, the one or more frames may include and/or provide a permission to transmit, a time of the transmission, and/or a duration of the transmission (e.g., a first duration). In one example, a wireless communication device can send and/or transmit one or more frames (e.g., RDG frames and/or trigger frames) to provide the permission to transmit, the time of the transmission, and/or the duration of the transmission (e.g., to the wireless communication node and/or a wireless user device). The wireless communication device, for instance, can use a RDG frame and/or a trigger frame to provide a permission to transmit to a wireless communication node, in addition to a time of the transmission and/or a duration of the transmission.

In some embodiments, the one or more frames may indicate and/or instruct to the wireless communication node to perform a first transmission to the wireless communication device (e.g., DL transmission via the interlink). The frame(s) may indicate to the wireless communication node to perform the transmission during a first duration. In some embodiments, the frame(s) may indicate and/or specify to the wireless user device to perform a second transmission to the wireless communication device (e.g., DL transmission via the intralink). The frame(s) may indicate to the wireless user device to perform the transmission during the first duration. As such, the wireless communication node and the wireless user device may perform simultaneous Tx operations (e.g., via the interlink and intralink) to the wireless communication device during the first duration, according to the frame(s) (e.g., the frame(s) allow the wireless communication node and/or the wireless user device to perform transmissions to the wireless communication device).

In some embodiments, and during the first duration, the wireless communication device may receive and/or obtain transmissions from the wireless communication node and/or the wireless user device (1004). According to the frame(s), the wireless communication device may receive the first transmission from the wireless communication node (e.g., during the first duration). In certain embodiments, the wireless communication device may receive the second transmission from the wireless user device, according to the frame(s). As such, the wireless communication device may receive simultaneous transmissions (e.g., during a same duration) via the interlink and the intralink from the wireless user device and the wireless communication node. After the first duration, the wireless communication device may transmit, send, and/or communicate acknowledgement messages to the wireless user device and/or the wireless communication node (1006). As such, the wireless communication device may send a first ACK message to the wireless communication node, responsive to receiving the first transmission. Furthermore, the wireless communication device may send a second ACK message to the wireless user device, responsive to receiving the second transmission. Indeed, the ACK messages (e.g., first ACK message and/or second ACK message) can be aligned in time and can enable simultaneous, coordinated and/or aligned Rx operations (e.g., Rx operations performed by the wireless communication device) across the plurality of channels.

During a second duration (e.g., non-overlapping with the first duration), the wireless communication device may perform transmissions to the wireless communication node and/or the wireless user device (1008). For example, the wireless communication device may perform the third transmission to the wireless communication node (e.g., during the second duration). In certain embodiments, the wireless communication device may perform the fourth transmission to the wireless user device (e.g., during the second duration). As such, the wireless communication device may perform simultaneous transmissions (e.g., during a same duration) via the interlink and the intralink to the wireless user device and the wireless communication node. Furthermore, the non-overlapping durations (e.g., first duration and second duration) can enable simultaneous, coordinated and/or aligned Tx or Rx operations across the plurality of channels.

After the second duration, the wireless communication device may receive and/or obtain ACK messages from the wireless communication node and/or the wireless user device (1010). As such, the wireless communication device may receive a third acknowledgement message from the wireless communication node, responsive to performing the third transmission. Furthermore, the wireless communication device may receive a fourth acknowledgement message from the wireless user device, responsive to performing the fourth transmission. Indeed, the ACK messages (e.g., third ACK message and/or fourth ACK message) can be aligned in time and can enable simultaneous, coordinated and/or aligned Tx operations (e.g., Tx operations performed by the wireless communication device) across the plurality of channels.

FIG. 11 is a flowchart showing a process 1100 for coordinating and/or configuring simultaneous (or overlapping) Tx or Rx operations across a plurality of channels, according to an example implementation of the present disclosure. The functionalities of the process 1100 may be implemented using, or performed by, the components detailed herein in connection with FIGS. 1-8. In some embodiments, the process 1100 is performed by a wireless communication device (e.g., computing device 210A and/or computing device 210B). In some embodiments, the process 1100 is performed by other entities. In some embodiments, the process 1100 includes more, fewer, or different steps than shown in FIG. 11.

In one approach, the wireless communication device may transmit 1102 one or more first request frames (e.g., frames including a TWT element having TWT element format 400) to a wireless communication node (e.g., AP 205) and a wireless user device (e.g., one or more HWDs 250A, 250B). The one or more first request frames may indicate to the wireless communication node to perform a first transmission to the wireless communication device (e.g., downlink transmission via interlink 530) during a first service period (SP) (e.g., Rx SP 510). The one or more first request frames may indicate to the wireless user device to perform a second transmission to the wireless communication device (e.g., downlink transmission via interlink 540) during the first SP (e.g., Rx SP 510). In some embodiments, the one or more first request frames may include a field (e.g., "Reserved" subfield in "Request type" field 450) indicating that the first SP is used for downlink only (e.g., transmissions to the wireless communication device).

In one approach, the wireless communication device may receive 1104, during the first SP (e.g., Rx SP 510), according to the one or more first request frames, the first transmission from the wireless communication node (e.g., transmission during Rx SP 510 via interlink 530), and/or the second transmission from the wireless user device (e.g., transmission during Rx SP 510 via intralink 540).

In some embodiments, the wireless communication device may transmit, after the first SP, according to the one or more first request frames, a first acknowledgement message (e.g., ACK 534 via interlink 530) to the wireless communication node, and/or a second acknowledgement message (e.g., ACK 544 via intralink 540) to the wireless user device. The one or more first request frames may include a field (e.g., field of TWT element 400 indicating or supporting a delayed acknowledgement policy) indicating that acknowledgement messages are to be transmitted after the first SP (e.g., Rx SP 510).

In some embodiments, the wireless communication device may transmit one or more second request frames (e.g., frames including a TWT element having TWT element format 400) to the wireless communication node and the wireless user device. The one or more second request frames may indicate to the wireless communication node to receive a third transmission from the wireless communication device (e.g., uplink transmission via interlink 530) during a second SP (e.g., Tx SP 520) that is non-overlapping with the first SP (e.g., Rx SP 510), and/or to transmit a third acknowledgement message (e.g., ACK 532 via interlink 530) to the wireless communication device after the second SP (e.g., Tx SP 520). The one or more second request frames may indicate to the wireless user device to receive a fourth transmission from the wireless communication device (e.g., uplink transmission via intralink 540) during the second SP (e.g., Tx SP 520), and/or to transmit a fourth acknowledgement message (e.g., ACK 542 via intralink 540) to the wireless communication device after the second SP (e.g., Tx SP 520). In some embodiments, the one or more second request frames may include a field (e.g., "Reserved" subfield in "Request type" field 450) indicating that the second SP is used for uplink only (e.g., transmissions from the wireless communication device).

In some embodiments, the wireless communication device may perform, during the second SP (e.g., Tx SP 520), according to the one or more second request frames, the third transmission to the wireless communication node, and the fourth transmission to the wireless user device. In some embodiments, the wireless communication device may receive, after the second SP (e.g., Tx SP 520), according to the one or more second request frames, the third acknowledgement message (e.g., ACK 532 via interlink 530) from the wireless communication node, and/or the fourth acknowledgement message (e.g., ACK 542 via intralink 540) from the wireless user device.

FIG. 12 is a flowchart showing a process 1200 for coordinating and/or configuring simultaneous (or overlapping) Tx or Rx operations across a plurality of channels, according to an example implementation of the present disclosure. The functionalities of the process 1200 may be implemented using, or performed by, the components detailed herein in connection with FIGS. 1-8. In some embodiments, the process 1200 is performed by a wireless communication node (e.g., AP 205). In some embodiments, the process 1200 is performed by other entities (e.g., one or more HWDs 250A, 250B). In some embodiments, the process 1200 includes more, fewer, or different steps than shown in FIG. 12.

In one approach, the wireless communication node (e.g., AP 205) may receive 1202 one or more first request frames from a wireless communication device (e.g., computing device 210A and/or computing device 210B). The wireless communication device may transmit the one or more first request frames (e.g., frames including a TWT element having TWT element format 400) to a wireless user device (e.g., one or more HWDs 250A, 250B). The one or more first request frames may indicate to the wireless communication node to perform a first transmission to the wireless communication device (e.g., downlink transmission via interlink 530) during a first service period (SP) (e.g., Rx SP 510). The one or more first request frames may indicate to the wireless user device to perform a second transmission to the wireless communication device (e.g., downlink transmission via intralink 540) during the first SP (e.g., Rx SP 510). In some embodiments, the one or more first request frames may include a field (e.g., "Reserved" subfield in "Request type" field 450) indicating that the first SP is used for downlink only (e.g., transmissions to the wireless communication device).

In one approach, the wireless communication node may transmit 1204, during the first SP (e.g., Rx SP 510), according to the one or more first request frames, the first transmission to the wireless communication device (e.g., transmission during Rx SP 510 via interlink 530). The wireless communication device may receive the second transmission from the wireless user device during the first SP (e.g., transmission during Rx SP 510 via intralink 540), according to the one or more first request frames.

In some embodiments, the wireless communication node may receive, after the first SP (e.g., Rx SP 510), according to the one or more first request frames, a first acknowledgement message (e.g., ACK 534 via interlink 530) from the wireless communication device. The wireless communication device may transmit a second acknowledgement message (e.g., ACK 544 via intralink 540) to the wireless user device after the first SP (e.g., Rx SP 510), according to the one or more first request frames. The one or more first request frames may include a field (e.g., field of TWT element 400 indicating a delayed acknowledgement policy) indicating that acknowledgement messages are to be transmitted after the first SP (e.g., Rx SP 510).

In some embodiments, the wireless communication node may receive one or more second request frames (e.g., frames including a TWT element having TWT element format 400) from the wireless communication device. The wireless communication device may transmit the one or more second request frames to the wireless communication node and/or the wireless user device. The one or more second request frames may indicate to the wireless communication node to receive a third transmission from the wireless communication device (e.g., uplink transmission via interlink 530) during a second SP (e.g., Tx SP 520) that is non-overlapping with the first SP (e.g., Rx SP 510), and to transmit a third acknowledgement message (e.g., ACK 532 via interlink 530) to the wireless communication device after the second SP (e.g., Tx SP 520). The one or more second request frames may indicate to the wireless user device to receive a fourth transmission from the wireless communication device (e.g., uplink transmission via intralink 540) during the second SP, and to transmit a fourth acknowledgement message (e.g., ACK 542 via intralink 540) to the wireless communication device after the second SP (e.g., Tx SP 520). In some embodiments, the one or more second request frames may include a field (e.g., "Reserved" subfield in "Request type" field 450) indicating that the second SP is used for uplink only (e.g., transmissions from the wireless communication device).

The wireless communication node may receive, during the second SP (e.g., Tx SP 520), according to the one or more second request frames, the third transmission from the wireless communication device. The wireless communication device may perform the fourth transmission to the wireless user device during the second SP (e.g., Tx SP 520), according to the one or more second request frames. In some embodiments, the wireless communication node may transmit, after the second SP (e.g., Tx SP 520), according to the one or more second request frames, the third acknowledgement message (e.g., ACK 532 via interlink 530) to the wireless communication device. The wireless communication device may receive the fourth acknowledgement message (e.g., ACK 542 via intralink 540) from the wireless user device after the second SP (e.g., Tx SP 520), according to the one or more second request frames.

Figure 13:
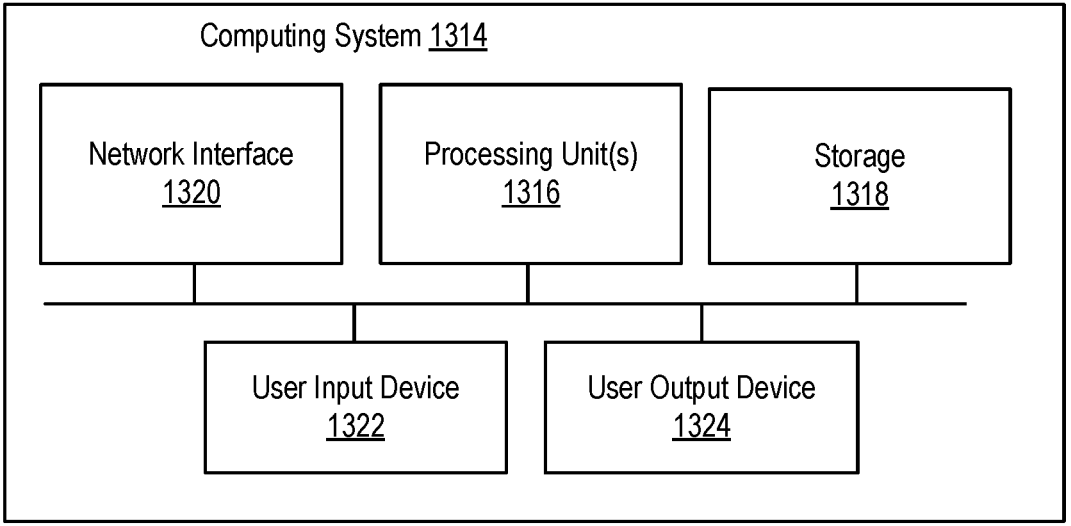
FIG. 13 is a block diagram of a computing environment, according to an example implementation of the present disclosure.

Various operations described herein can be implemented on computer systems. FIG. 13 shows a block diagram of a representative computing system 1314 usable to implement the present disclosure. In some embodiments, the computing device 210, the HWD 250 or both of FIGS. 1-2 are implemented by the computing system 1314. Computing system 1314 can be implemented, for example, as a consumer device such as a smartphone, other mobile phone, tablet computer, wearable computing device (e.g., smart watch, eyeglasses, head wearable display), desktop computer, laptop computer, or implemented with distributed computing devices. The computing system 1314 can be implemented to provide VR, AR, MR experience. In some embodiments, the computing system 1314 can include conventional computer components such as processors 1316, storage device 1318, network interface 1320, user input device 1322, and user output device 1324.

Network interface 1320 can provide a connection to a wide area network (e.g., the Internet) to which WAN interface of a remote server system is also connected. Network interface 1320 can include a wired interface (e.g., Ethernet) and/or a wireless interface implementing various RF data communication standards such as Wi-Fi, Bluetooth, or cellular data network standards (e.g., 3G, 4G, 5G, 60 GHz, LTE, etc.).

User input device 1322 can include any device (or devices) via which a user can provide signals to computing system 1314; computing system 1314 can interpret the signals as indicative of particular user requests or information. User input device 1322 can include any or all of a keyboard, touch pad, touch screen, mouse or other pointing device, scroll wheel, click wheel, dial, button, switch, keypad, microphone, sensors (e.g., a motion sensor, an eye tracking sensor, etc.), and so on.

User output device 1324 can include any device via which computing system 1314 can provide information to a user. For example, user output device 1324 can include a display to display images generated by or delivered to computing system 1314. The display can incorporate various image generation technologies, e.g., a liquid crystal display (LCD), light-emitting diode (LED) including organic light-emitting diodes (OLED), projection system, cathode ray tube (CRT), or the like, together with supporting electronics (e.g., digital-to-analog or analog-to-digital converters, signal processors, or the like). A device such as a touchscreen that function as both input and output device can be used. Output devices

1324 can be provided in addition to or instead of a display. Examples include indicator lights, speakers, tactile "display" devices, printers, and so on.

Some implementations include electronic components, such as microprocessors, storage and memory that store computer program instructions in a computer readable storage medium (e.g., non-transitory computer readable medium). Many of the features described in this specification can be implemented as processes that are specified as a set of program instructions encoded on a computer readable storage medium. When these program instructions are executed by one or more processors, they cause the processors to perform various operation indicated in the program instructions. Examples of program instructions or computer code include machine code, such as is produced by a compiler, and files including higher-level code that are executed by a computer, an electronic component, or a microprocessor using an interpreter. Through suitable programming, processor 1316 can provide various functionality for computing system 1314, including any of the functionality described herein as being performed by a server or client, or other functionality associated with message management services.

It will be appreciated that computing system 1314 is illustrative and that variations and modifications are possible. Computer systems used in connection with the present disclosure can have other capabilities not specifically described here. Further, while computing system 1314 is described with reference to particular blocks, it is to be understood that these blocks are defined for convenience of description and are not intended to imply a particular physical arrangement of component parts. For instance, different blocks can be located in the same facility, in the same server rack, or on the same motherboard. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Implementations of the present disclosure can be realized in a variety of apparatus including electronic devices implemented using any combination of circuitry and software.

Having now described some illustrative implementations, it is apparent that the foregoing is illustrative and not limiting, having been presented by way of example. In particular, although many of the examples presented herein involve specific combinations of method acts or system elements, those acts and those elements can be combined in other ways to accomplish the same objectives. Acts, elements and features discussed in connection with one implementation are not intended to be excluded from a similar role in other implementations or implementations.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit and/or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular can also embrace implementations including a plurality of these elements, and any references in plural to any implementation or element or act herein can also embrace implementations including only a single element. References in the singular or plural form are not intended to limit the presently disclosed systems or methods, their components, acts, or elements to single or plural configurations. References to any act or element being based on any information, act or element can include implementations where the act or element is based at least in part on any information, act, or element.

Any implementation disclosed herein can be combined with any other implementation or embodiment, and references to "an implementation," "some implementations," "one implementation" or the like are not necessarily mutually exclusive and are intended to indicate that a particular feature, structure, or characteristic described in connection with the implementation can be included in at least one implementation or embodiment. Such terms as used herein are not necessarily all referring to the same implementation. Any implementation can be combined with any other implementation, inclusively or exclusively, in any manner consistent with the aspects and implementations disclosed herein.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Systems and methods described herein may be embodied in other specific forms without departing from the characteristics thereof. References to "approximately," "about" "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

The term "coupled" and variations thereof includes the joining of two members directly or indirectly to one another. Such joining may be stationary (e.g., permanent or fixed) or moveable (e.g., removable or releasable). Such joining may be achieved with the two members coupled directly with or to each other, with the two members coupled with each other using a separate intervening member and any additional intermediate members coupled with one another, or with the two members coupled with each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References to "or" can be construed as inclusive so that any terms described using "or" can indicate any of a single, more than one, and all of the described terms. A reference to "at least one of 'A' and 'B'" can include only 'A', only 'B', as well as both 'A' and 'B'. Such references used in conjunction with "comprising" or other open terminology can include additional items.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

References herein to the positions of elements (e.g., "top," "bottom," "above," "below") are merely used to describe the orientation of various elements in the FIGURES. The orientation of various elements may differ according to other exemplary embodiments, and that such variations are intended to be encompassed by the present disclosure.

What is claimed is:

1. A method comprising:

transmitting, by a wireless communication device, one or more first request frames to a wireless communication node and a wireless user device, the one or more first request frames indicating:

to the wireless communication node to perform a first transmission to the wireless communication device during a first service period (SP) of a target wake time (TWT) schedule, and to the wireless user device to perform a second transmission to the wireless communication device during the first SP;

receiving, by the wireless communication device during the first SP, according to the one or more first request frames, the first transmission from the wireless communication node, and the second transmission from the wireless user device; and transmitting, by the wireless communication device after the first SP, according to the one or more first request frames, a first acknowledgement message to the wireless communication node, and a second acknowledgement message to the wireless user device.

2. The method of claim 1, wherein the one or more first request frames include a field indicating that the first SP is used for downlink only.

3. The method of claim 1, wherein the one or more first request frames include a field indicating that acknowledgement messages are to be transmitted after the first SP.

4. The method of claim 1, further comprising:

transmitting, by the wireless communication device, one or more second request frames to the wireless communication node and the wireless user device, the one or more second request frames indicating:

to the wireless communication node to receive a third transmission from the wireless communication device during a second SP that is non-overlapping with the first SP, and to transmit a third acknowledgement message to the wireless communication device after the second SP, and to the wireless user device to receive a fourth transmission from the wireless communication device during the second SP, and to transmit a fourth acknowledgement message to the wireless communication device after the second SP; and performing, by the wireless communication device during the second SP, according to the one or more second request frames, the third transmission to the wireless communication node, and the fourth transmission to the wireless user device.

5. The method of claim 4, wherein the one or more second request frames include a field indicating that the second SP is used for uplink only.

6. The method of claim 4, further comprising:

receiving, by the wireless communication device after the second SP, according to the one or more second request frames, the third acknowledgement message from the wireless communication node, and the fourth acknowledgement message from the wireless user device.

7. A wireless communication device comprising:

one or more processors configured to:

transmit one or more first request frames to a wireless communication node and a wireless user device, the one or more first request frames indicating:

to the wireless communication node to perform a first transmission to the wireless communication device during a first service period (SP) of a target wake time (TWT) schedule, and to the wireless user device to perform a second transmission to the wireless communication device during the first SP;

receive, during the first SP, according to the one or more first request frames, the first transmission from the wireless communication node, and the second transmission from the wireless user device; and transmit, after the first SP, according to the one or more first request frames, a first acknowledgement message to the wireless communication node, and a second acknowledgement message to the wireless user device.

8. The wireless communication device of claim 7, wherein the one or more first request frames include a field indicating that the first SP is used for downlink only.

9. The wireless communication device of claim 7, wherein the one or more first request frames include a field indicating that acknowledgement messages are to be transmitted after the first SP.

10. The wireless communication device of claim 7, wherein the one or more processors are further configured to:

transmit one or more second request frames to the wireless communication node and the wireless user device, the one or more second request frames indicating:

to the wireless communication node to receive a third transmission from the wireless communication device during a second SP that is non-overlapping with the first SP, and to transmit a third acknowledgement message to the wireless communication device after the second SP, and to the wireless user device to receive a fourth transmission from the wireless communication device during the second SP, and to transmit a fourth acknowledgement message to the wireless communication device after the second SP; and perform, during the second SP, according to the one or more second request frames, the third transmission to the wireless communication node, and the fourth transmission to the wireless user device.

11. The wireless communication device of claim 10, wherein the one or more second request frames include a field indicating that the second SP is used for uplink only.

12. The wireless communication device of claim 10, the one or more processors are further configured to:

receive, after the second SP, according to the one or more second request frames, the third acknowledgement message from the wireless communication node, and the fourth acknowledgement message from the wireless user device.

13. A method comprising:

receiving, by a wireless communication node, one or more first request frames from a wireless communication device, wherein the wireless communication device transmits the one or more first request frames to a wireless user device, the one or more first request frames indicating:

to the wireless communication node to perform a first transmission to the wireless communication device during a first service period (SP) of a target wake time (TWT) schedule, and to the wireless user device to perform a second transmission to the wireless communication device during the first SP;

transmitting, by the wireless communication node during the first SP, according to the one or more first request frames, the first transmission to the wireless communication device, wherein the wireless communication device receives the second transmission from the wireless user device during the first SP, according to the one or more first request frames; and receiving, by the wireless communication node after the first SP of the TWT, according to the one or more first request frames, a first acknowledgement message from the wireless communication device, wherein the wireless communication device transmits a second acknowledgement message to the wireless user device after the first SP of the TWT, according to the one or more first request frames.

14. The method of claim 13, wherein the one or more first request frames include a field indicating that the first SP is used for downlink only.

15. The method of claim 13, further comprising:

receiving, by the wireless communication node, one or more second request frames from the wireless communication device, wherein the wireless communication device transmits the one or more second request frames to the wireless user device, the one or more second request frames indicating:

to the wireless communication node to receive a third transmission from the wireless communication device during a second SP that is non-overlapping with the first SP, and to transmit a third acknowledgement message to the wireless communication device after the second SP, and to the wireless user device to receive a fourth transmission from the wireless communication device during the second SP, and to transmit a fourth acknowledgement message to the wireless communication device after the second SP; and receiving, by the wireless communication node during the second SP, according to the one or more second request frames, the third transmission from the wireless communication device, wherein the wireless communication device performs the fourth transmission to the wireless user device during the second SP, according to the one or more second request frames.

16. The method of claim 15, wherein the one or more second request frames include a field indicating that the second SP is used for uplink only.

17. The method of claim 15, further comprising:

transmitting, by the wireless communication node after the second SP, according to the one or more second request frames, the third acknowledgement message to the wireless communication device, wherein the wireless communication device receives the fourth acknowledgement message from the wireless user device after the second SP, according to the one or more second request frames.

* * * * *